United States Patent
Choi et al.

(10) Patent No.: US 12,526,936 B2
(45) Date of Patent: Jan. 13, 2026

(54) DISPLAY DEVICE

(71) Applicant: LG ELECTRONICS INC., Seoul (KR)

(72) Inventors: Wuram Choi, Seoul (KR); Jonggil Pyo, Seoul (KR); Kwaneun Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 18/550,026

(22) PCT Filed: May 17, 2021

(86) PCT No.: PCT/KR2021/006134
§ 371 (c)(1),
(2) Date: Sep. 11, 2023

(87) PCT Pub. No.: WO2022/244895
PCT Pub. Date: Nov. 24, 2022

(65) Prior Publication Data
US 2024/0155789 A1    May 9, 2024

(51) Int. Cl.
*G06F 1/16*    (2006.01)
*H05K 5/00*    (2025.01)
*H05K 5/02*    (2006.01)
*H05K 5/03*    (2006.01)
*H05K 7/00*    (2006.01)

(52) U.S. Cl.
CPC ............ *H05K 5/0217* (2013.01); *H05K 5/03* (2013.01)

(58) Field of Classification Search
CPC .... G06F 1/1675; G06F 1/1633; G06F 1/1629; G06F 1/1624; G06F 1/1626; H05K 5/0217; H05K 5/03
See application file for complete search history.

(56) References Cited

U.S. PATENT DOCUMENTS

| | | | | |
|---|---|---|---|---|
| 6,129,237 A | * | 10/2000 | Miyahara | G06F 1/1626 220/255 |
| 7,330,548 B2 | * | 2/2008 | Kim | H04M 1/23 379/433.11 |
| 10,550,995 B1 | * | 2/2020 | Hung | H04M 1/0233 |

(Continued)

FOREIGN PATENT DOCUMENTS

| KR | 1020150031525 | 3/2015 |
|---|---|---|
| KR | 1020200114329 | 10/2020 |

(Continued)

OTHER PUBLICATIONS

PCT International Application No. PCT/KR2021/006134, International Search Report dated Feb. 10, 2022, 2 pages.

*Primary Examiner* — Anthony M Haughton
(74) *Attorney, Agent, or Firm* — LEE, HONG, DEGERMAN, KANG & WAIMEY

(57) ABSTRACT

A display device is disclosed. The display device of the present disclosure includes: a display panel; a frame to which the display panel is coupled; a cover assembly disposed in front of the display panel and movably coupled to the frame; a bar disposed behind the display panel and fixed to the frame; and a rotator disposed under the display panel, one side of which is coupled to the front surface of the bar, and the other side of which comes into contact with the rear surface of the cover assembly.

15 Claims, 25 Drawing Sheets

(56) References Cited

U.S. PATENT DOCUMENTS

| | | | | |
|---|---|---|---|---|
| 10,973,144 | B2* | 4/2021 | Lee | H05K 7/14 |
| 11,193,624 | B2* | 12/2021 | You | F16M 11/16 |
| 12,031,665 | B2* | 7/2024 | Seol | A47B 81/06 |
| 2006/0017356 | A1* | 1/2006 | Hoss | A47B 81/06 |
| | | | | 312/319.7 |
| 2009/0225239 | A1* | 9/2009 | Osada | H04R 1/028 |
| | | | | 348/841 |
| 2018/0359869 | A1* | 12/2018 | Kim | G09F 9/301 |
| 2020/0208772 | A1* | 7/2020 | Woo | H04M 1/0227 |
| 2021/0337684 | A1* | 10/2021 | Pyo | H05K 5/0217 |

FOREIGN PATENT DOCUMENTS

| | | |
|---|---|---|
| KR | 1020200114337 | 10/2020 |
| KR | 1020210017565 | 2/2021 |

* cited by examiner

[FIG. 1]
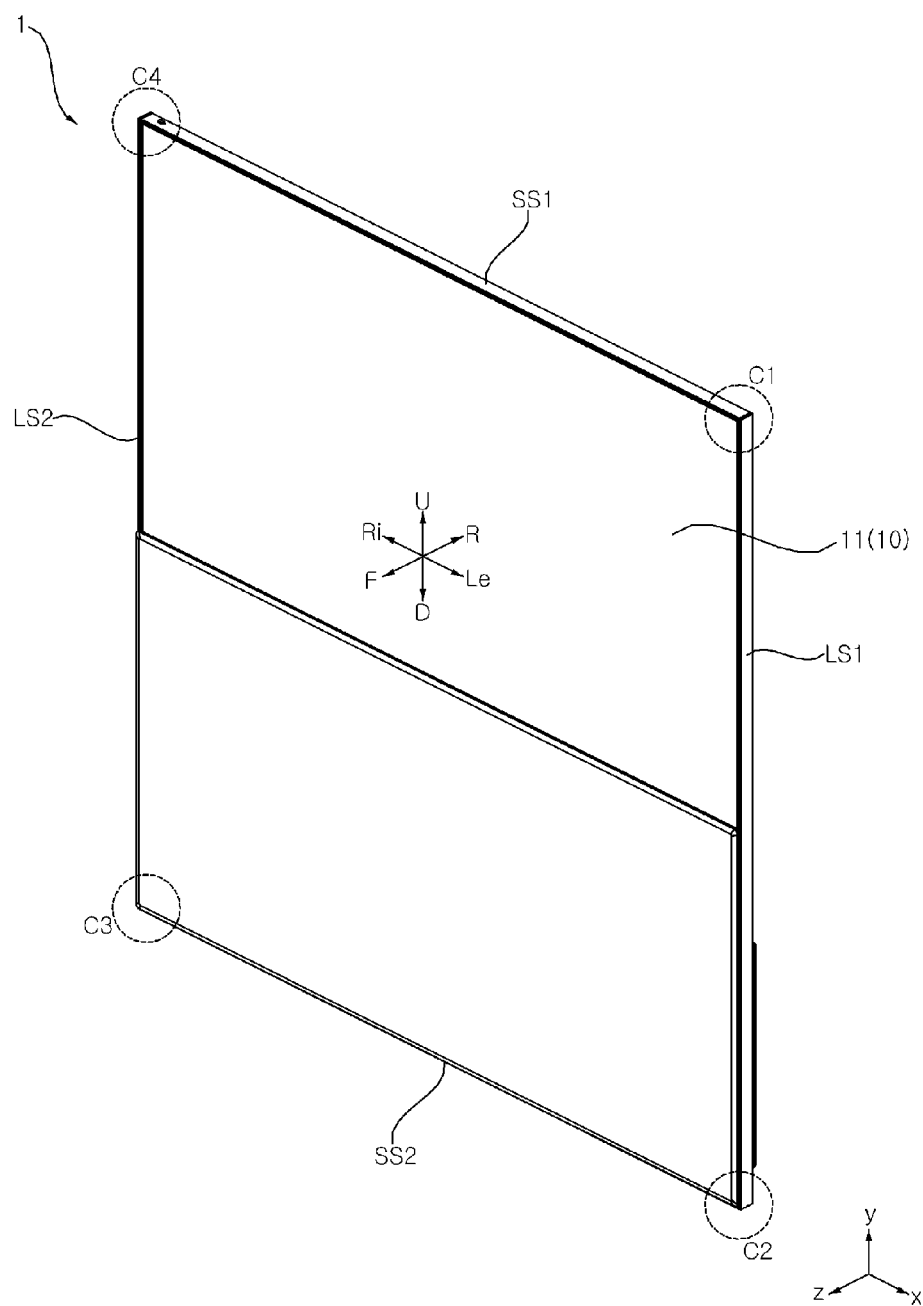

[FIG. 2]
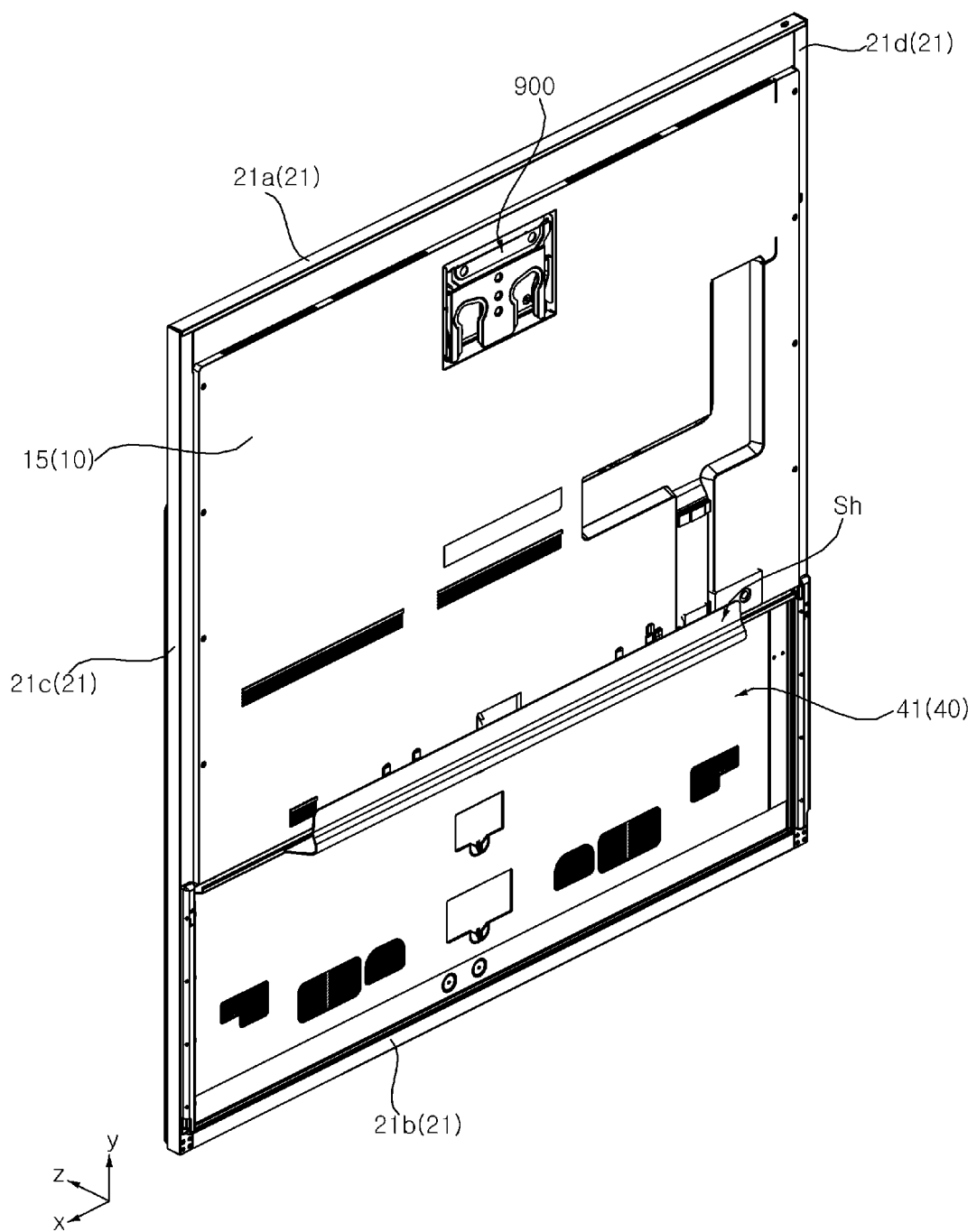

[FIG. 3]
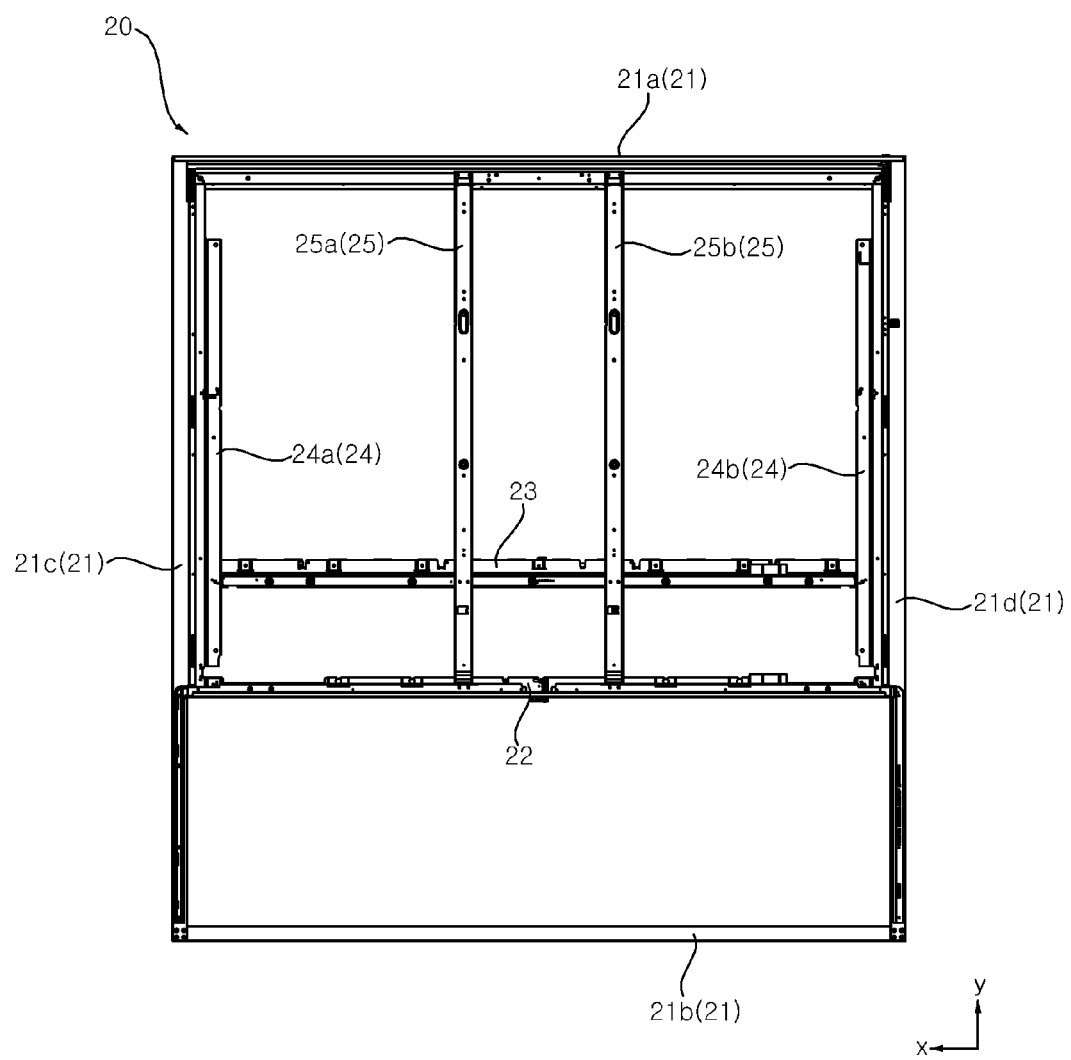

[FIG. 4]
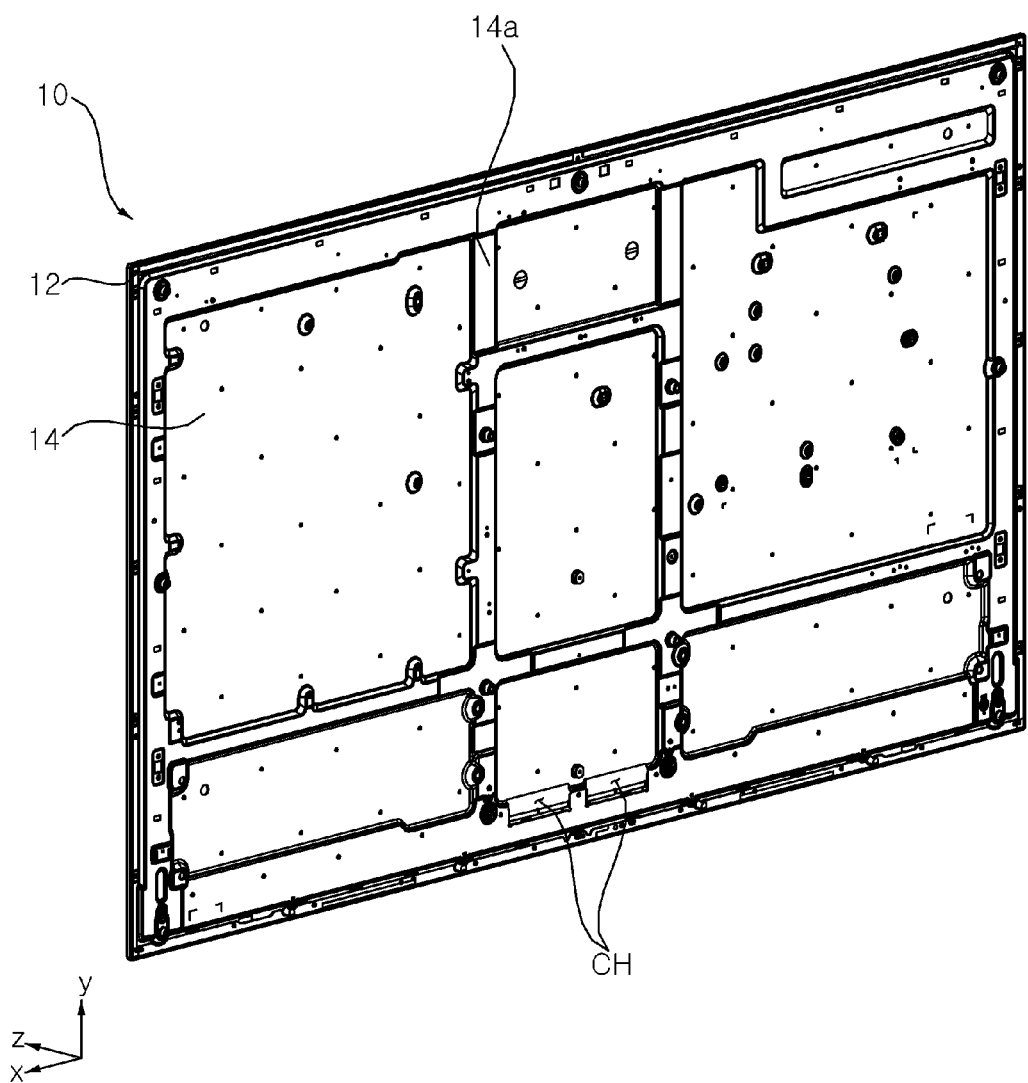

[FIG. 5]
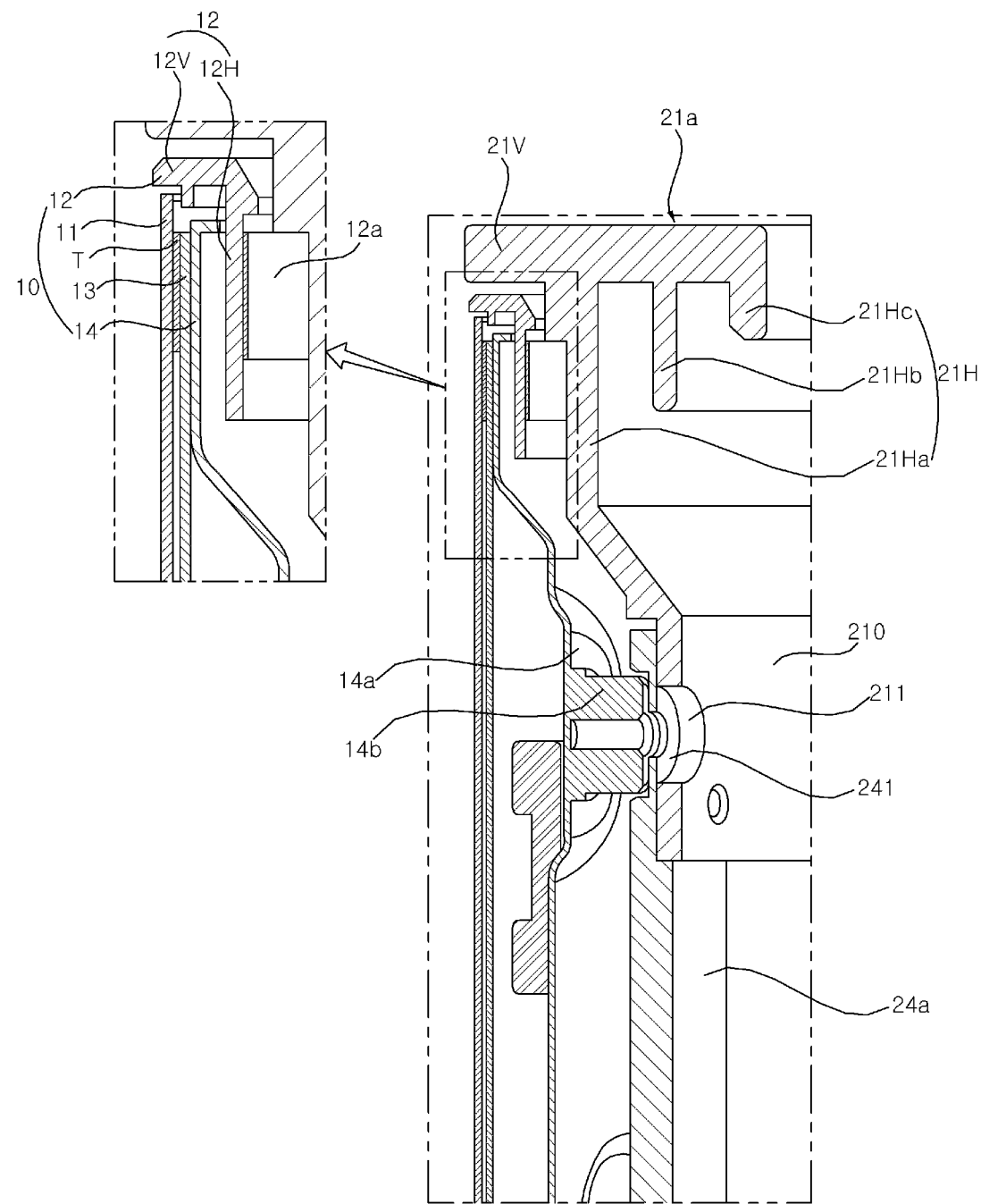

[FIG. 6]
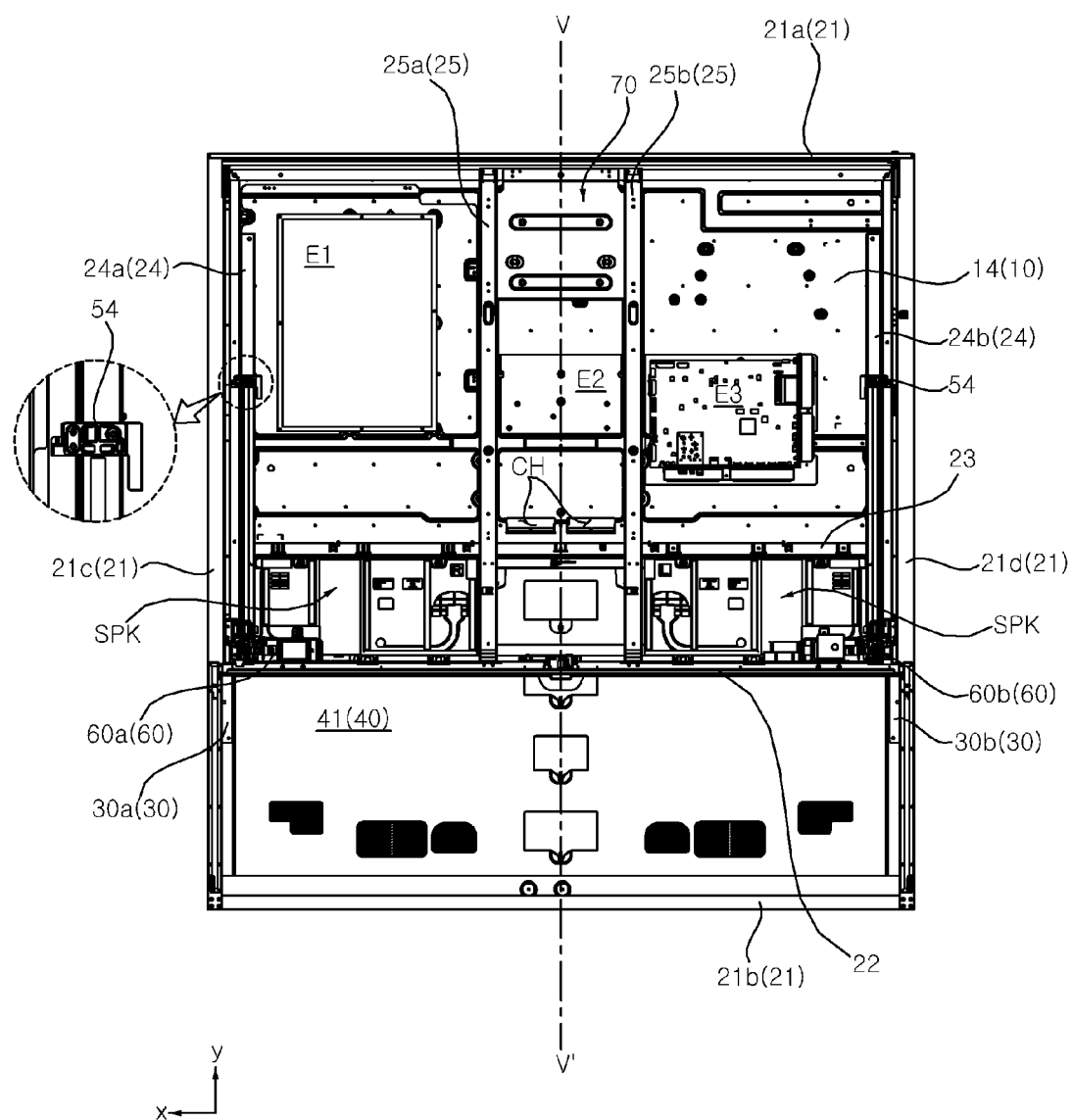

[FIG. 7]
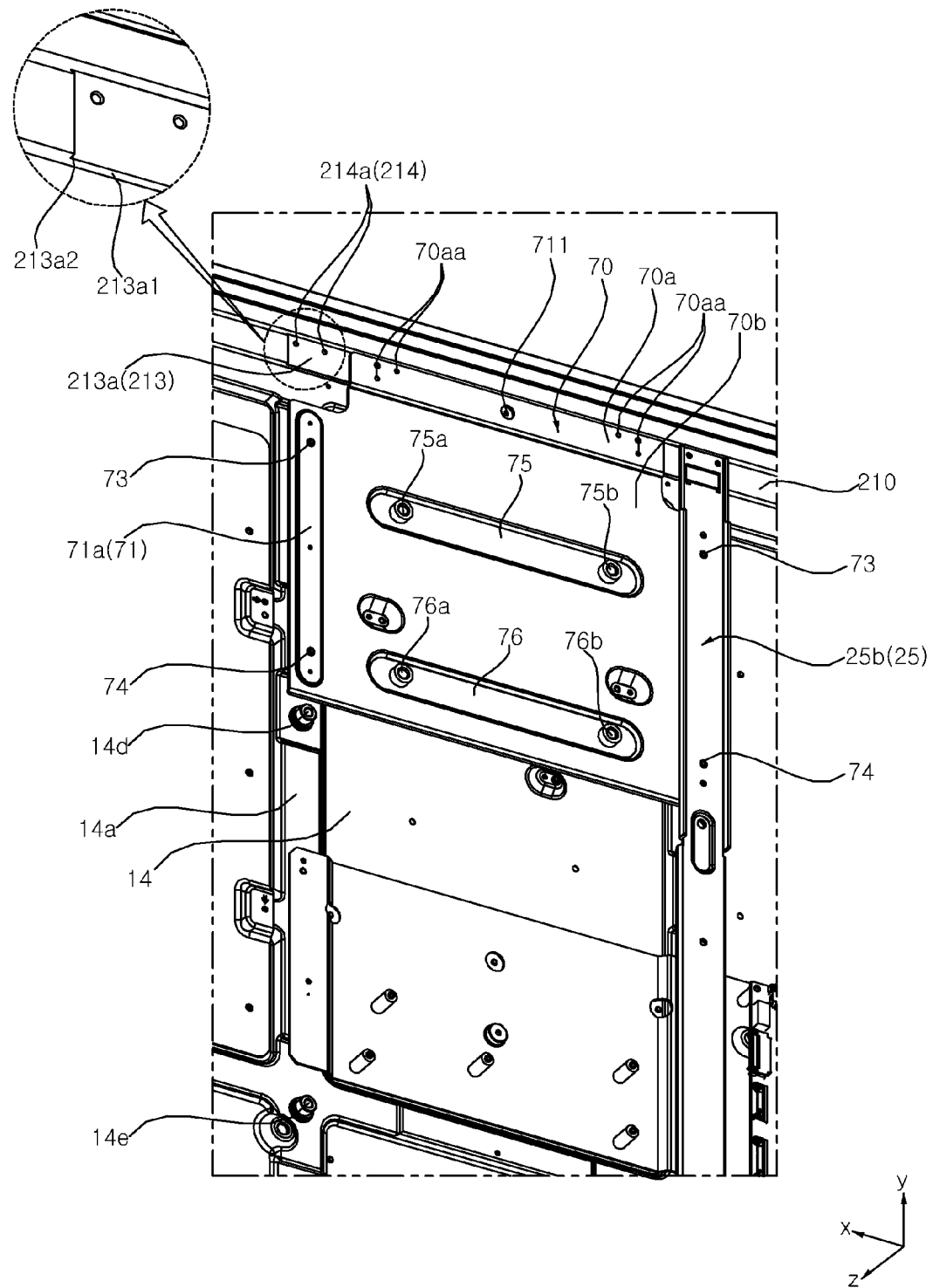

[FIG. 8]
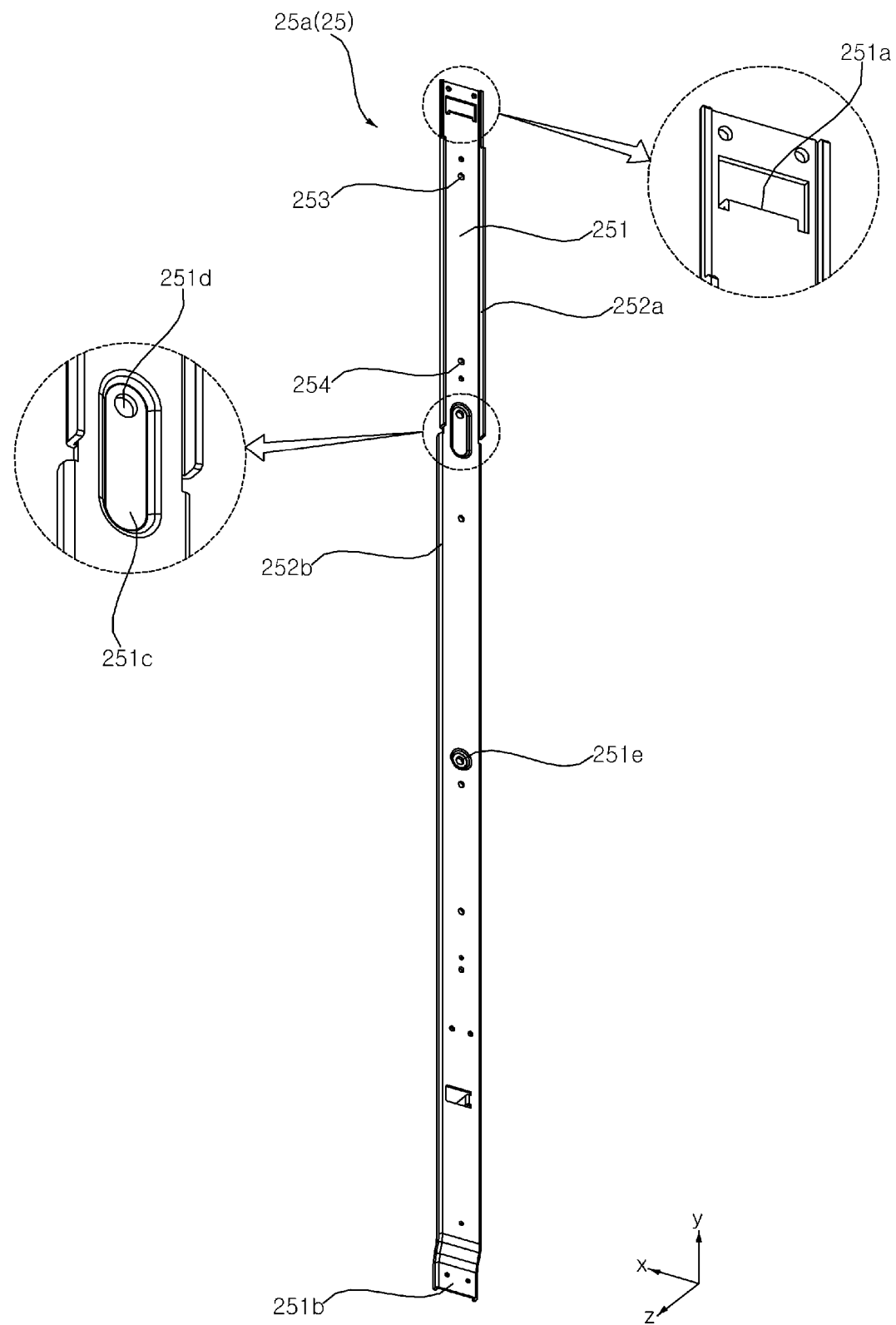

[FIG. 9]
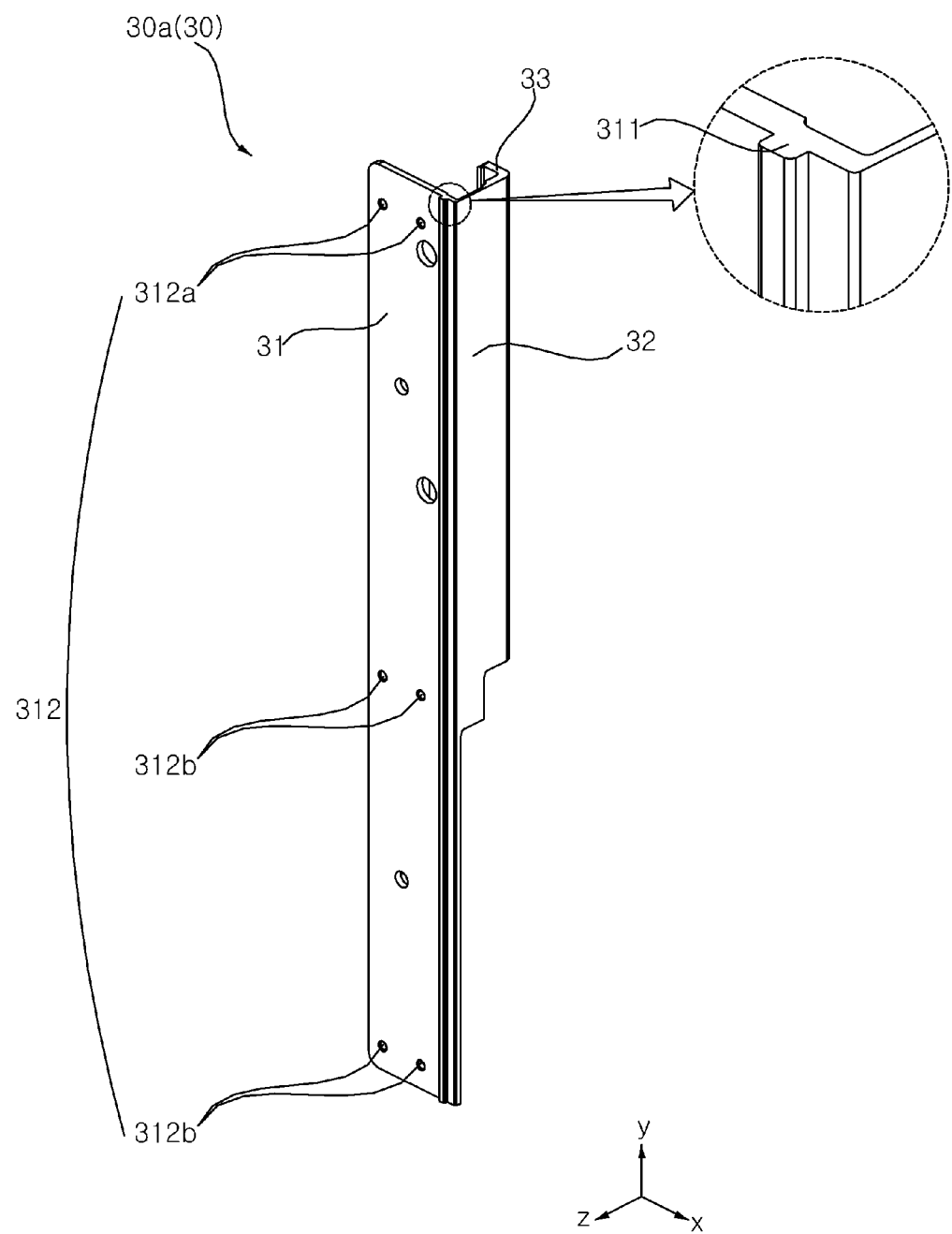

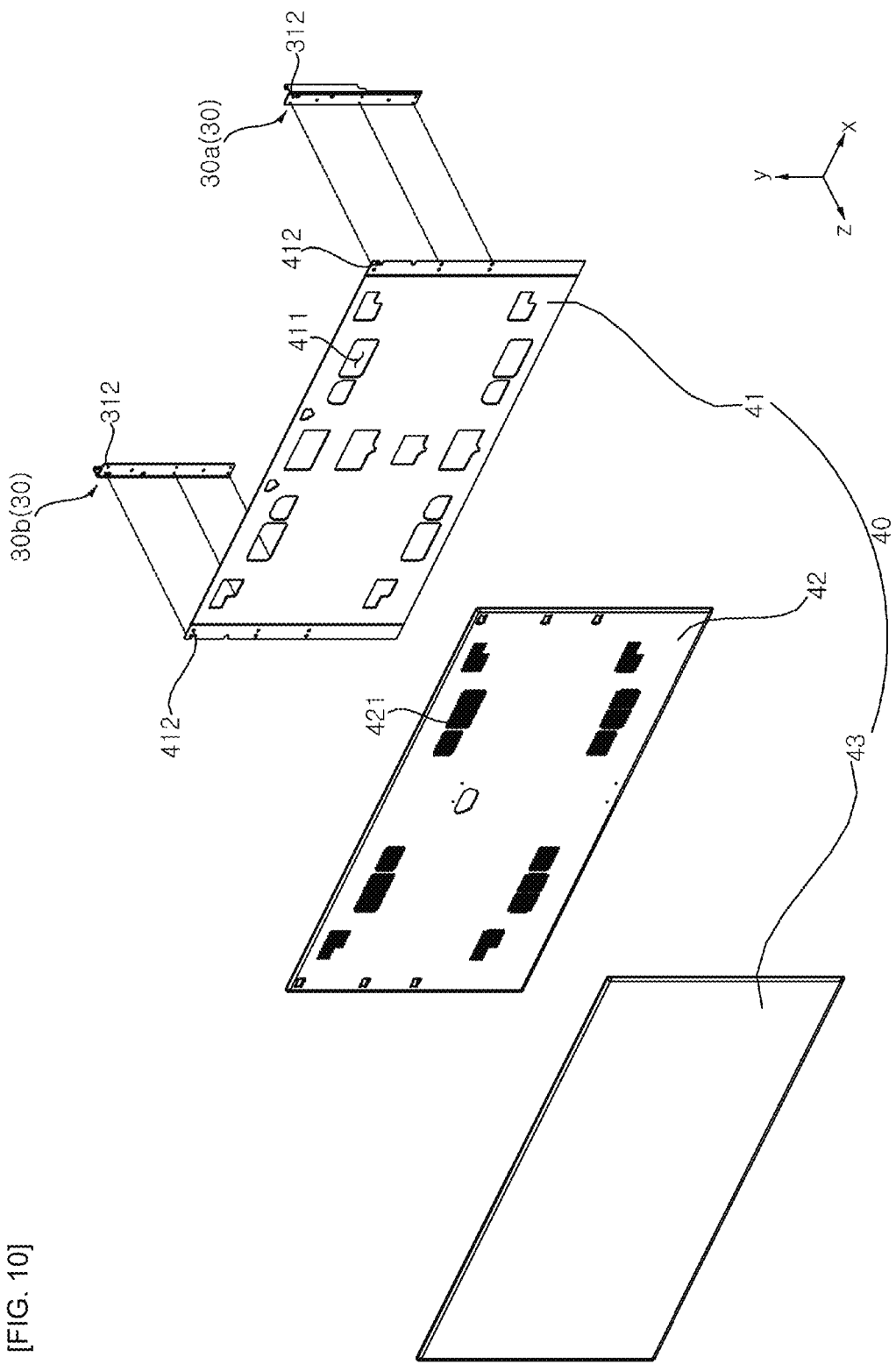
[FIG. 10]

[FIG. 11]
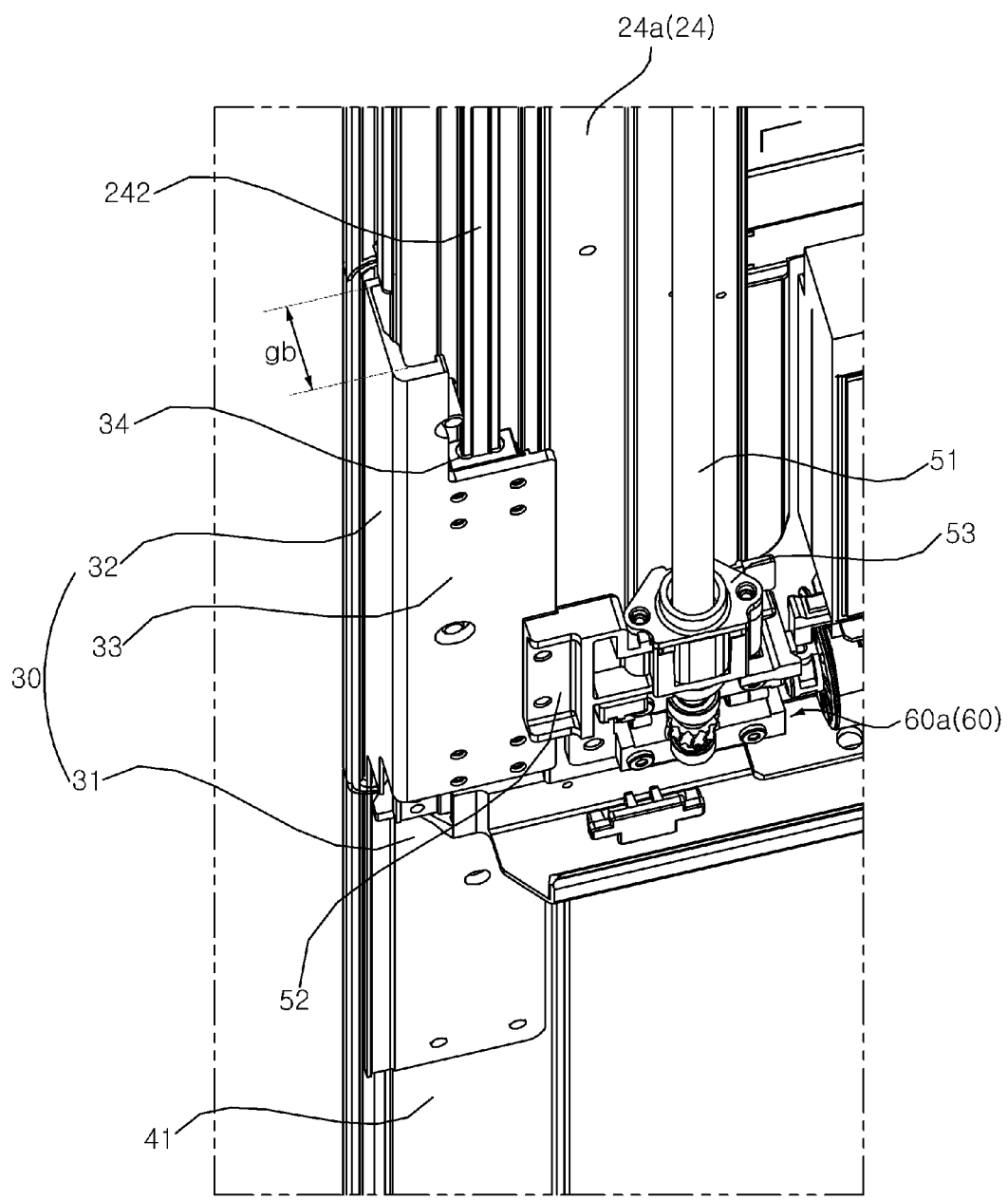

[FIG. 12]
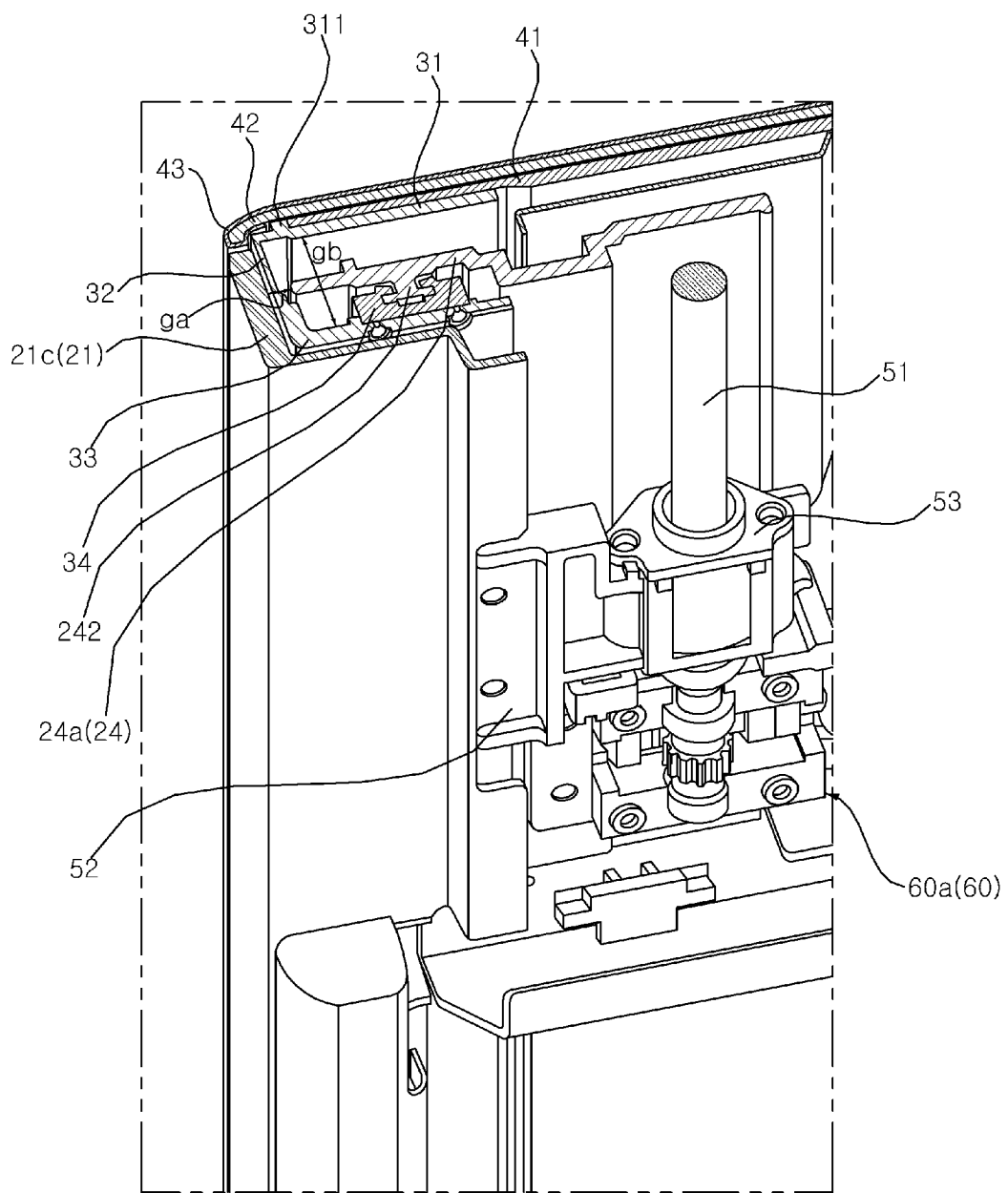

[FIG. 13]
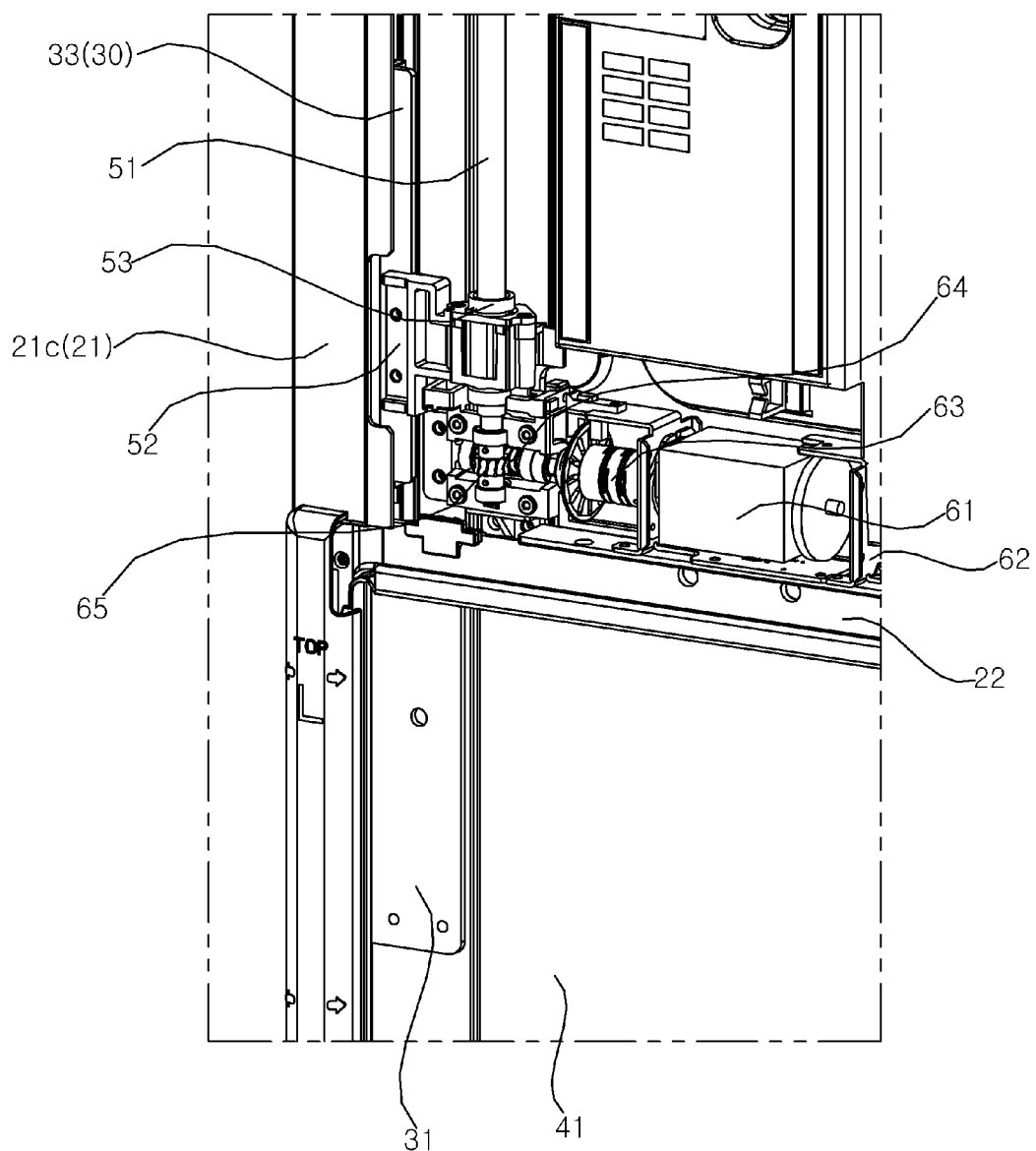

[FIG. 14]
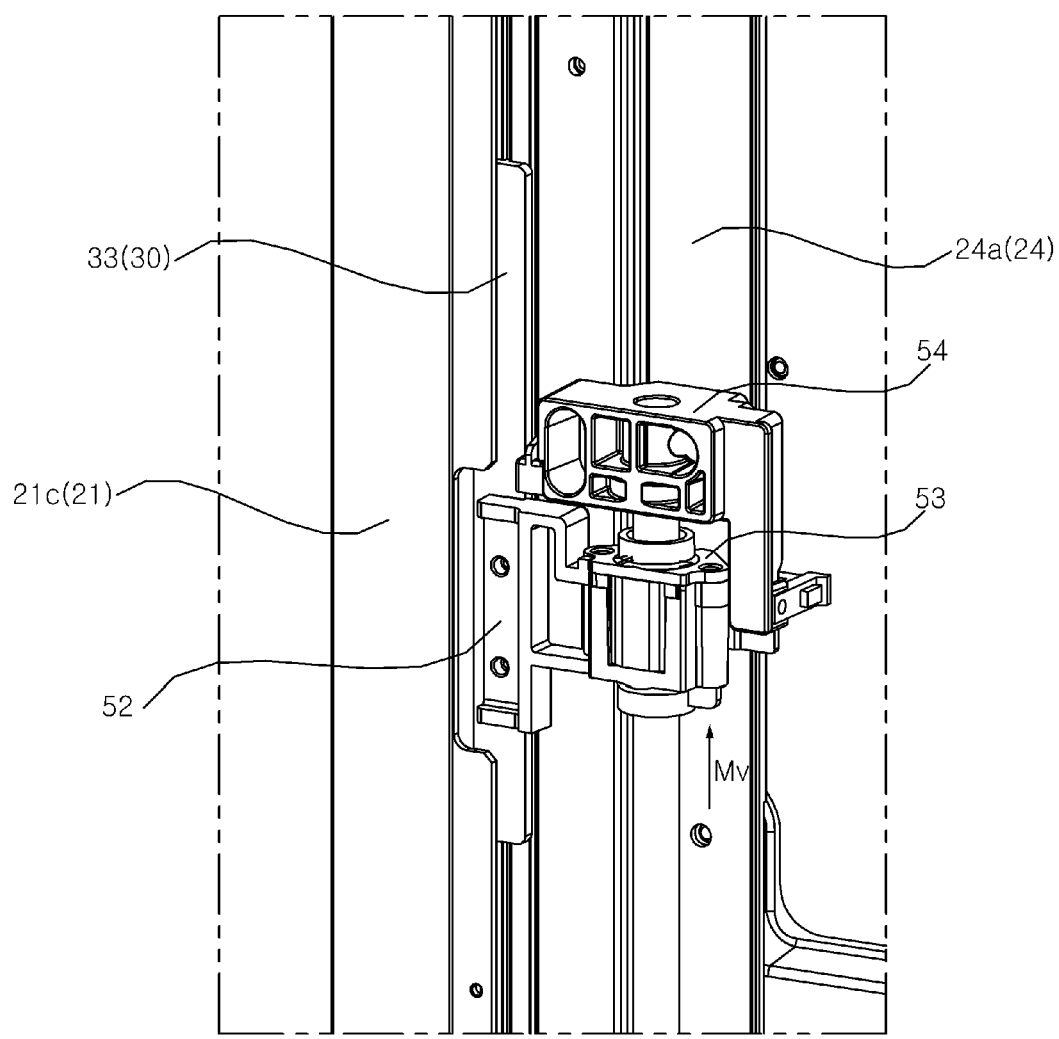

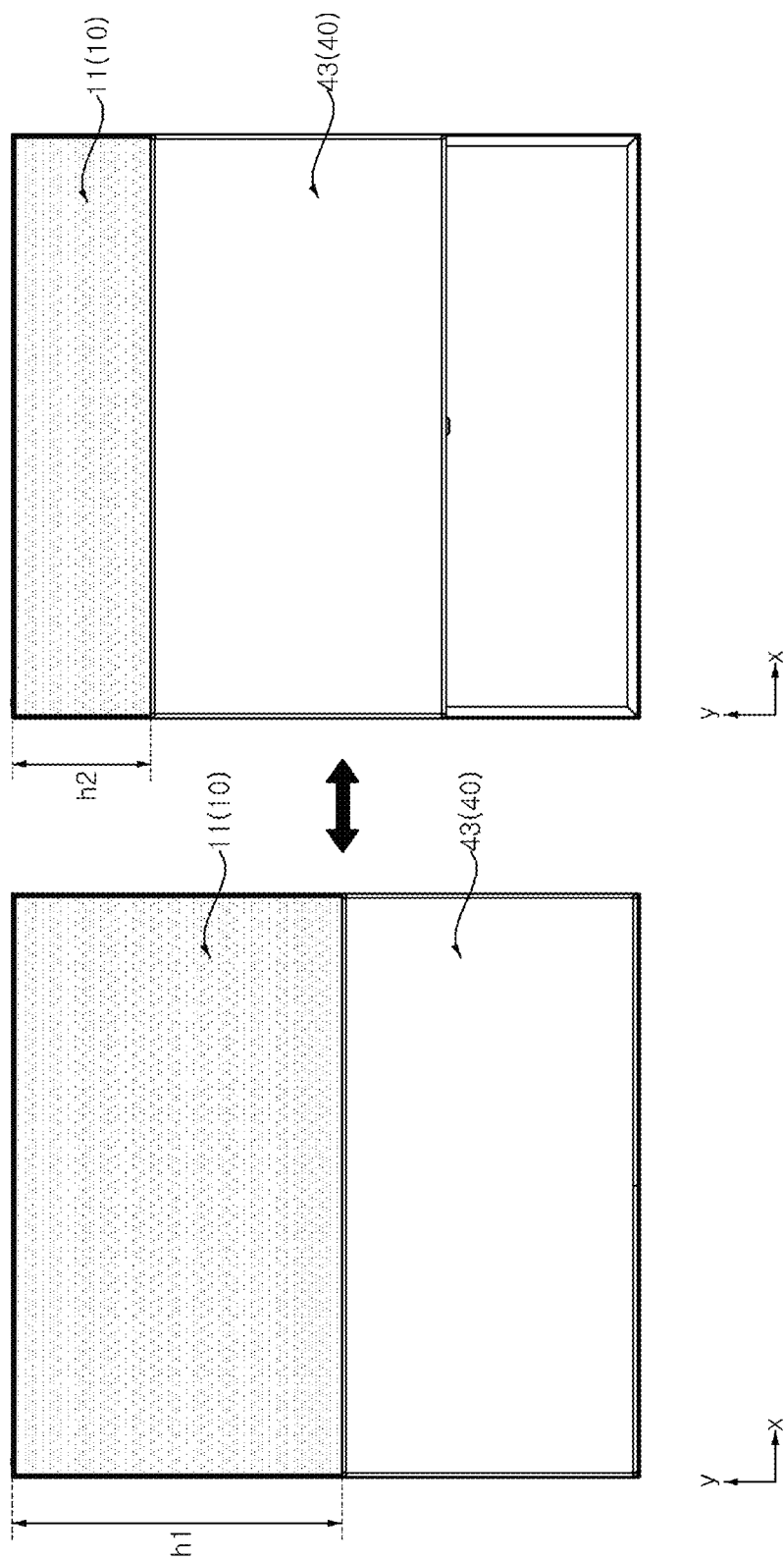
[FIG. 15]

[FIG. 16]
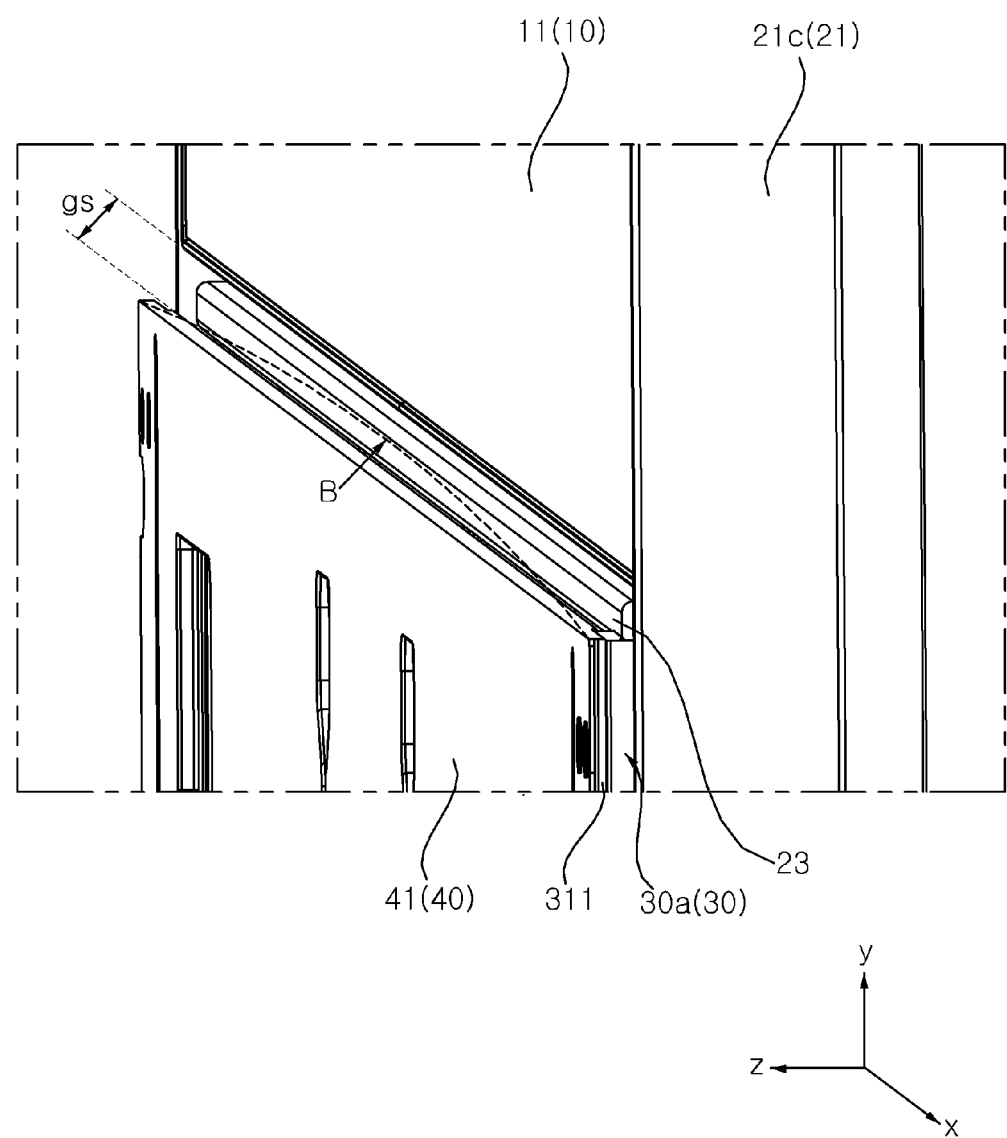

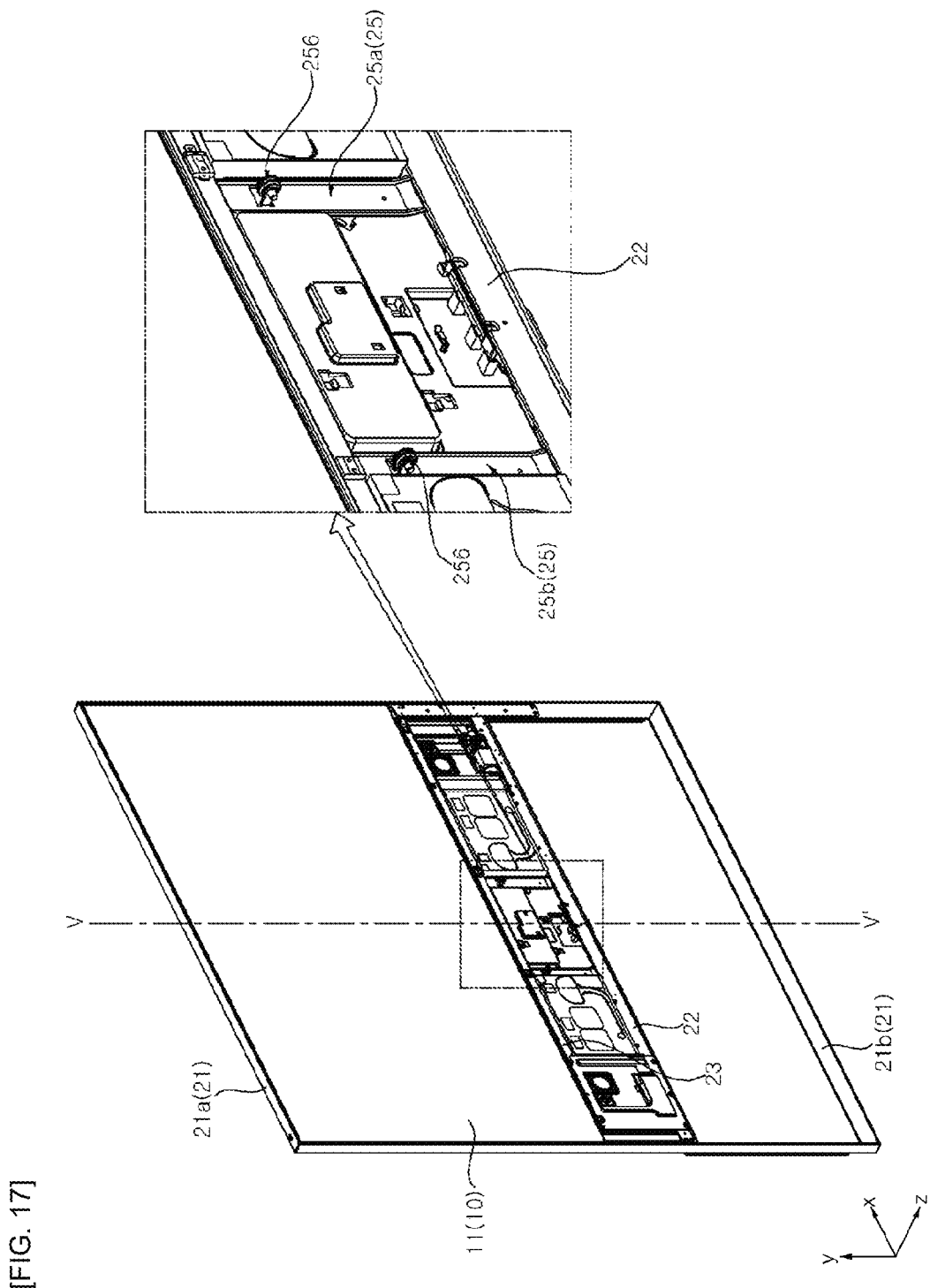
[FIG. 17]

[FIG. 18]
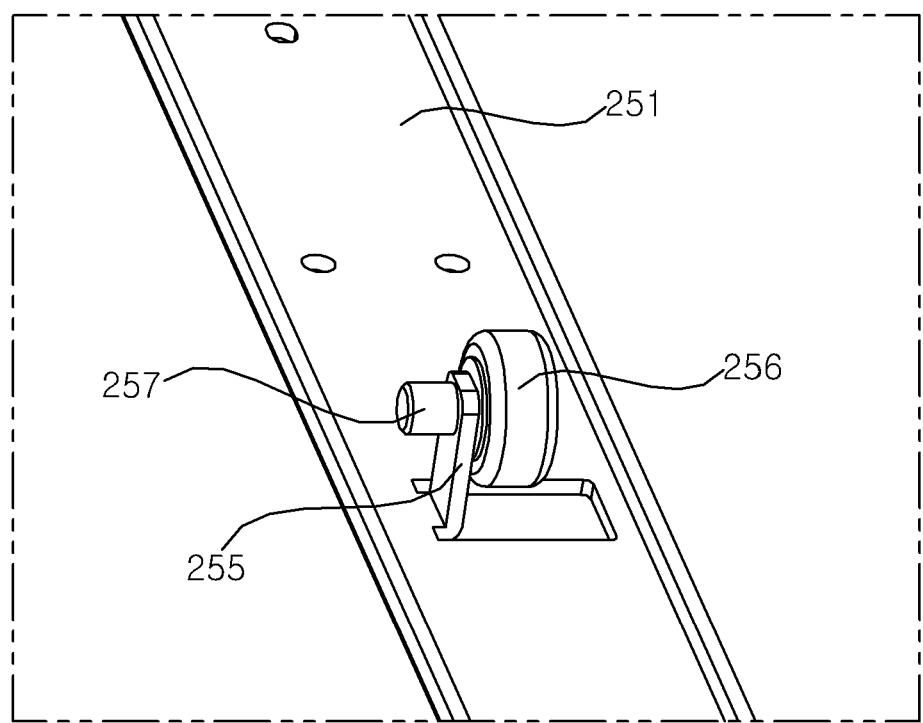

[FIG. 19]
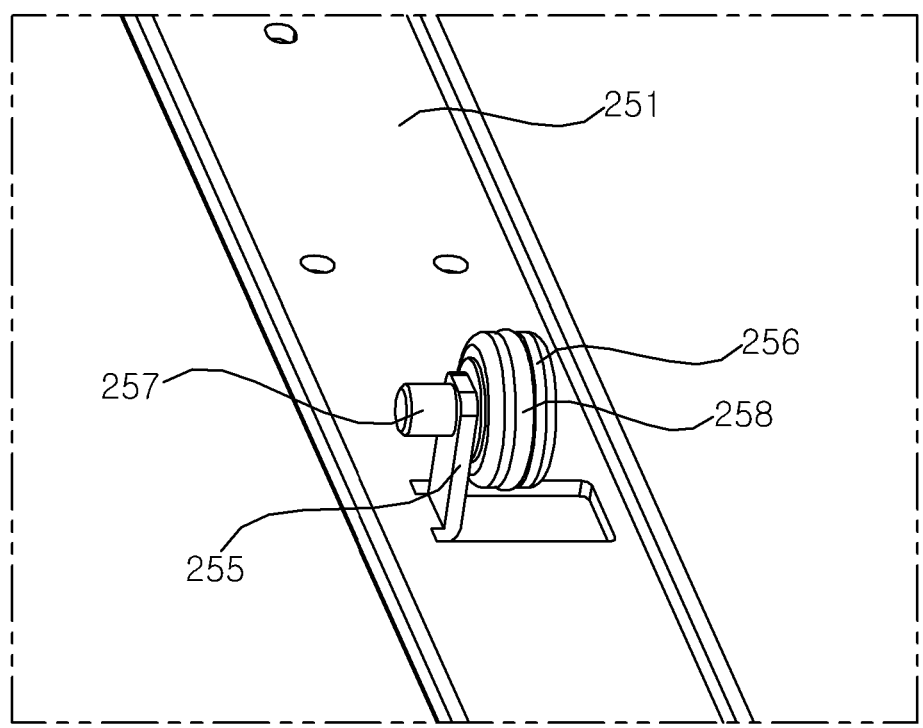

[FIG. 20]
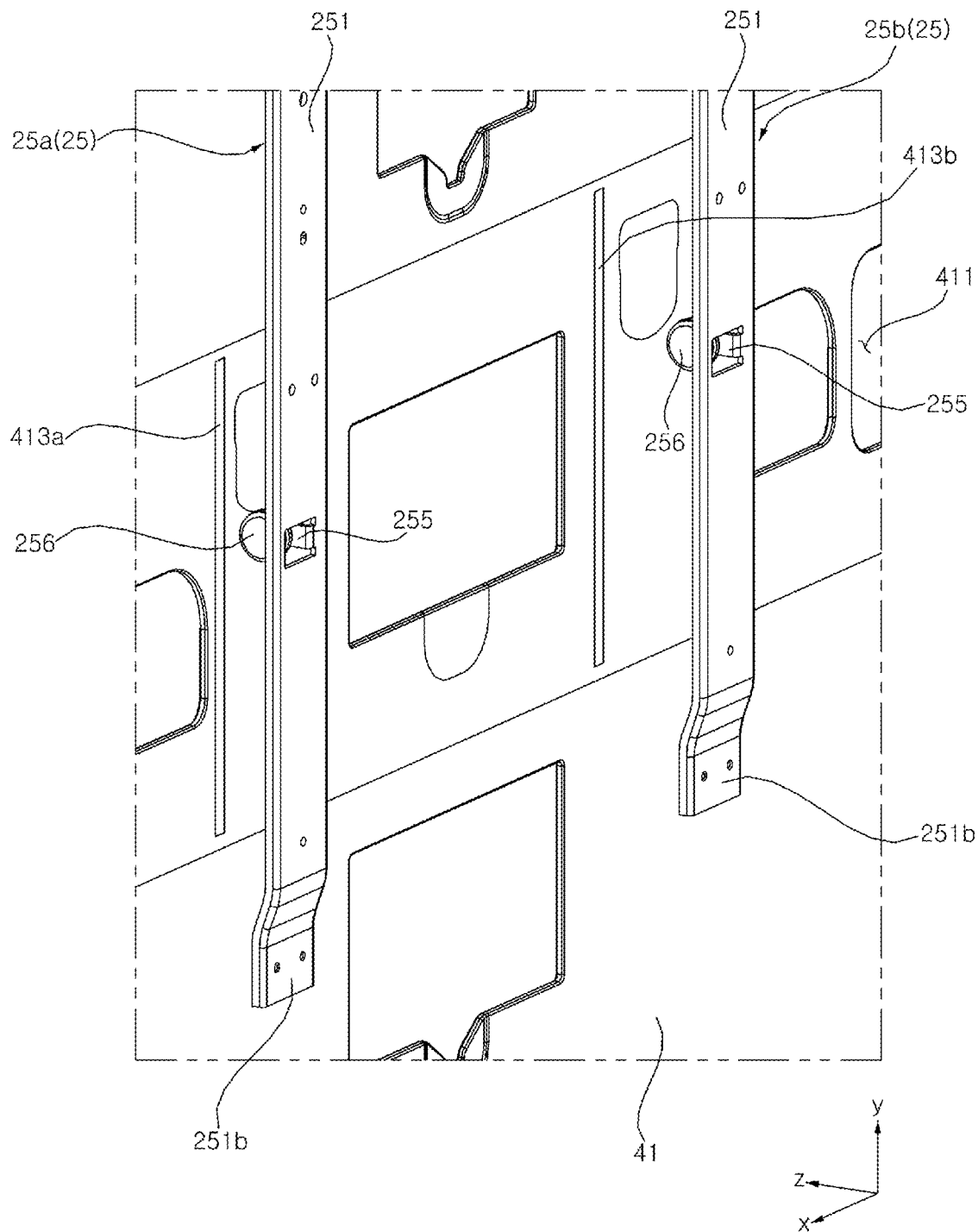

[FIG. 21]
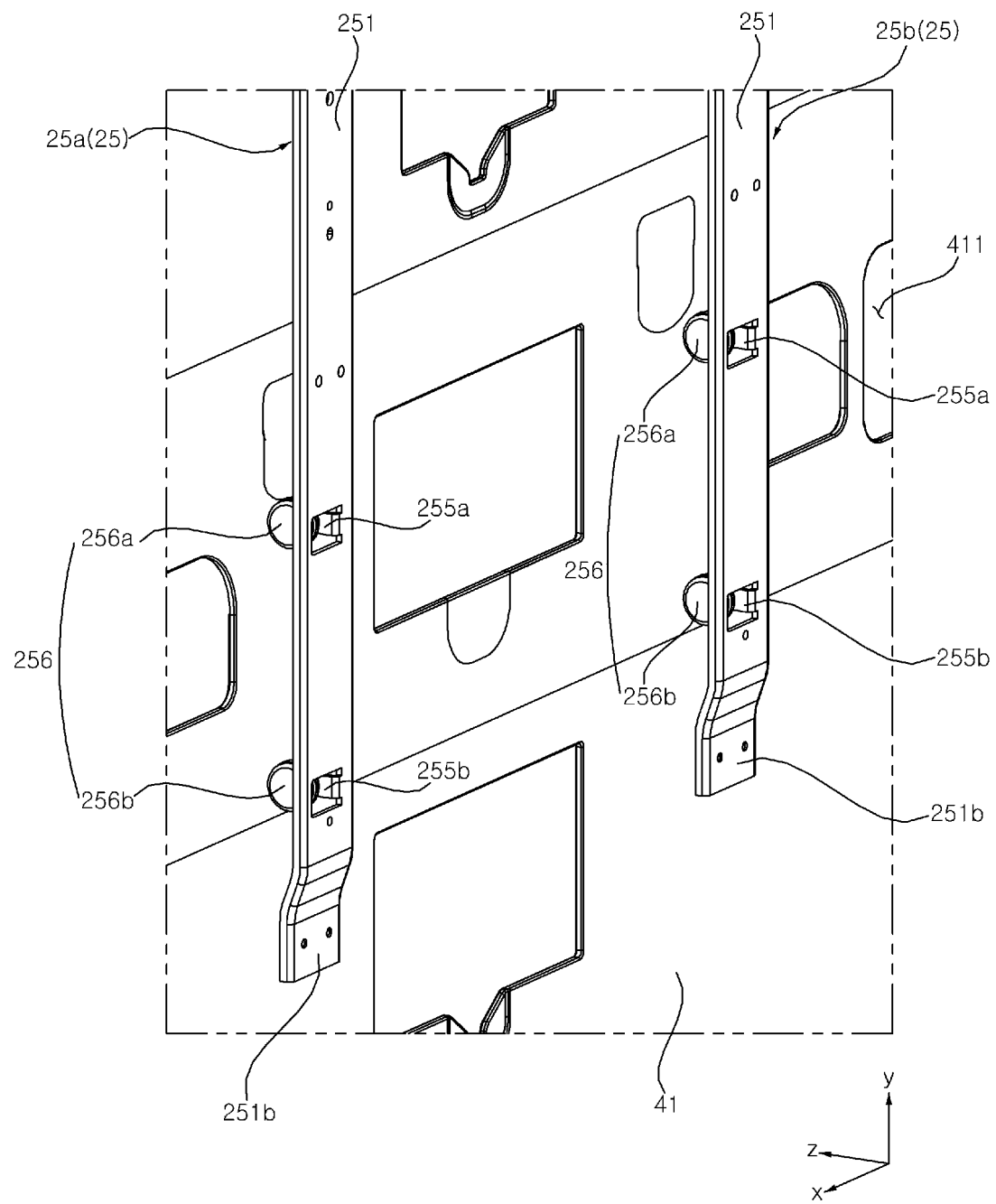

[FIG. 22]
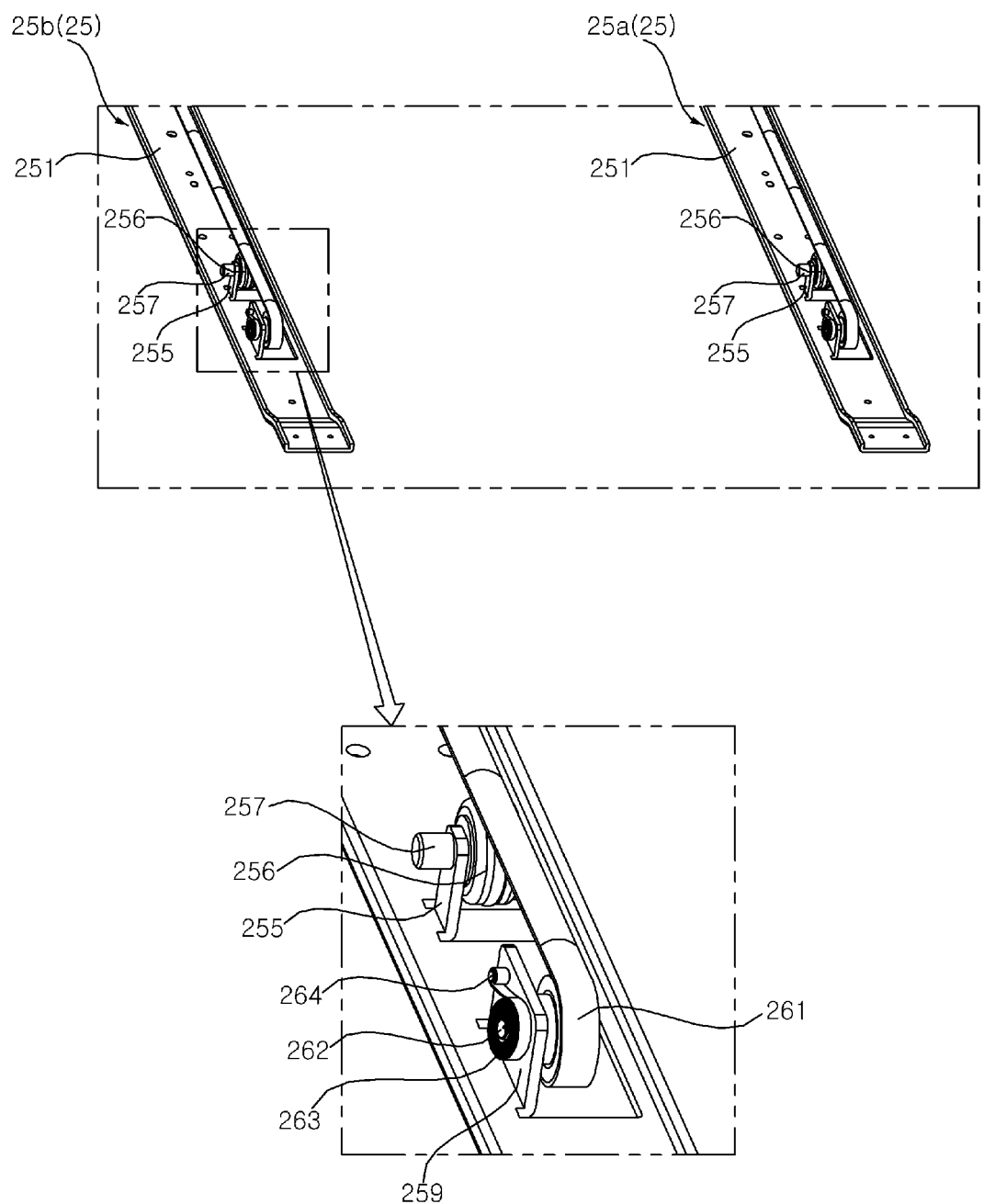

[FIG. 23]
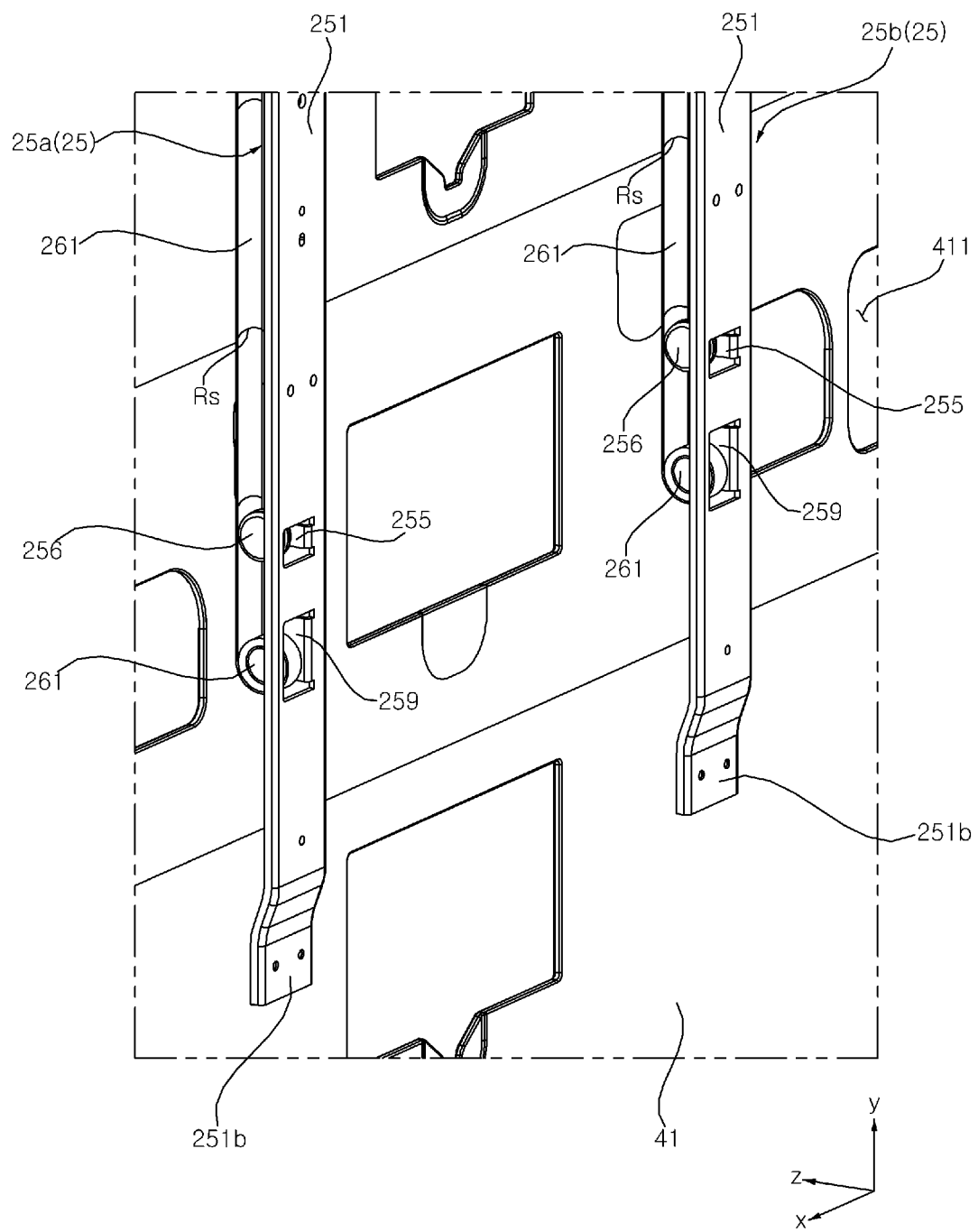

[FIG. 24]
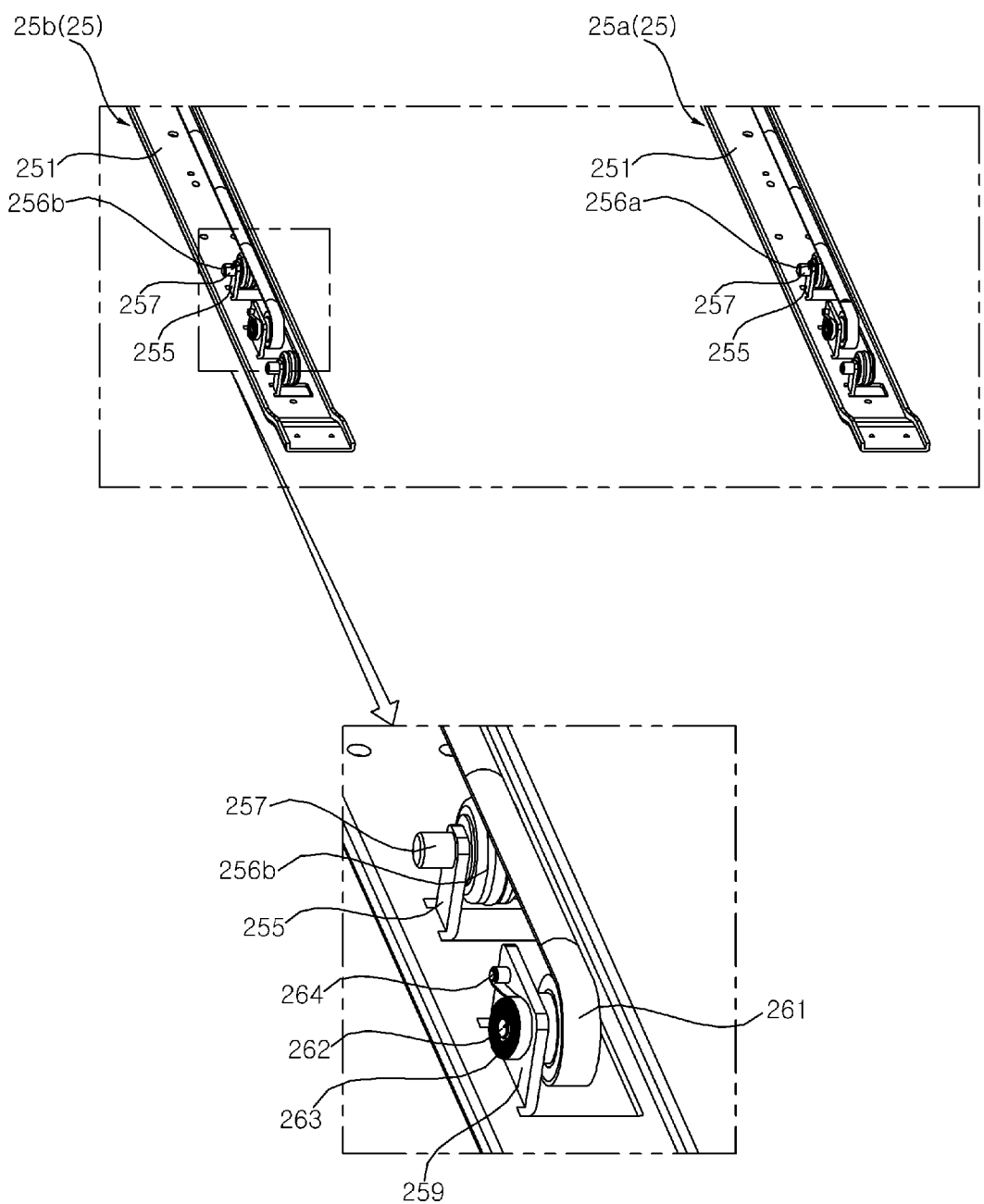

[FIG. 25]
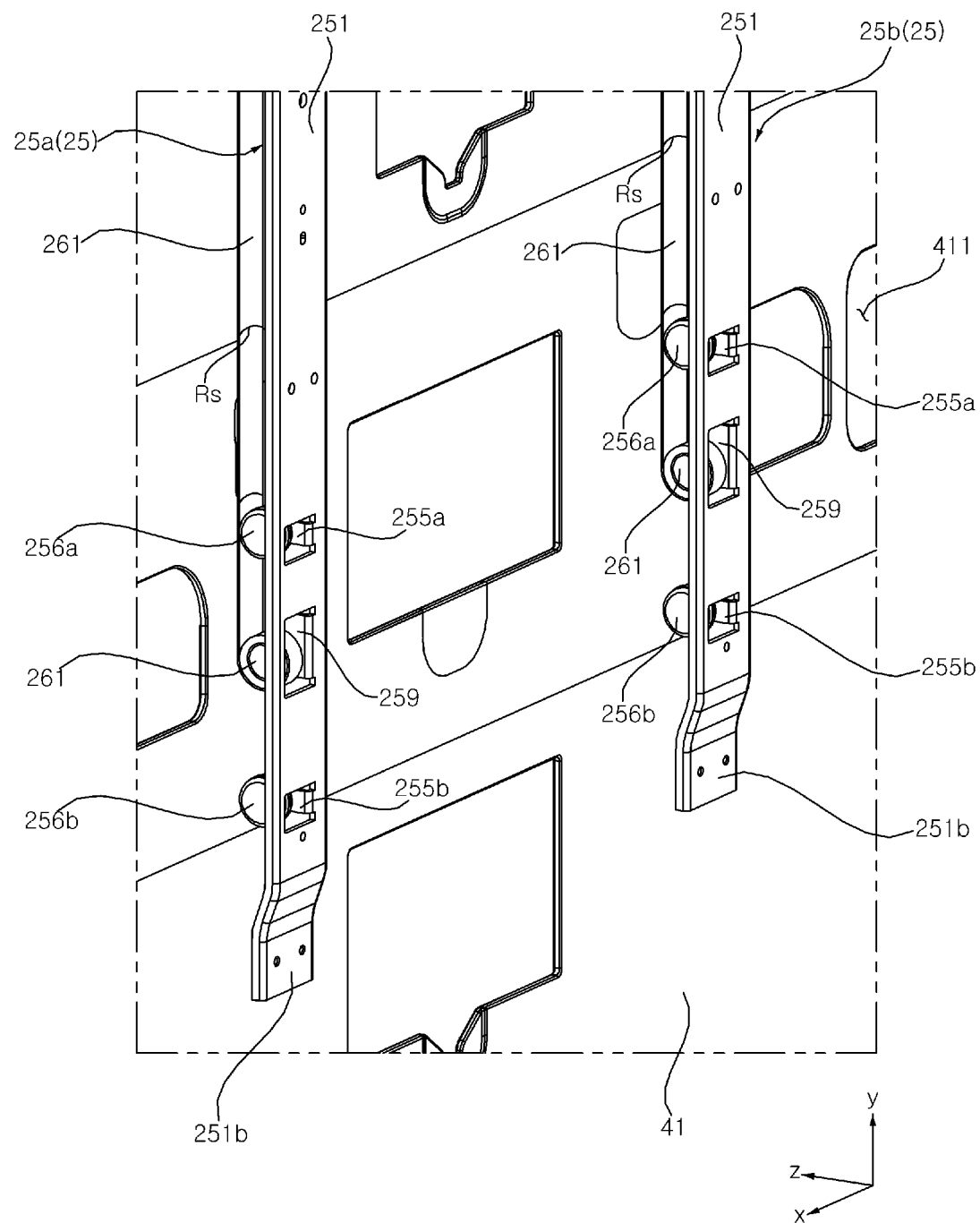

DISPLAY DEVICE

CROSS-REFERENCE TO RELATED APPLICATION(S)

This application is the National Stage filing under 35 U.S.C. 371 of International Application No. PCT/KR2021/006134, filed on May 17, 2021, the contents of which are all incorporated by reference herein in its entirety.

TECHNICAL FIELD

The present disclosure relates to a display device.

BACKGROUND ART

As information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among these, a LCD panel includes a TFT substrate and a color filter substrate facing each other with a liquid crystal layer interposed therebetween, and may display an image by using light provided from a backlight unit. In addition, an OLED panel may display an image by depositing an organic material layer capable of self-emitting light on a substrate on which a transparent electrode is formed.

Recently, a lot of research has been conducted on a structure covering the front surface of a display panel.

DISCLOSURE OF INVENTION

Technical Problem

An object of the present disclosure is to solve the above and other problems.

Another object may be to provide a cover structure capable of covering or opening the front surface of a display panel.

Another object may be to provide a display device capable of preventing bending of a cover.

Another object may be to provide a display device capable of reducing friction or noise due to a contact between a cover and a rotator that prevents bending of a cover.

Another object may be to provide a display device capable of improving the operability of a cover.

Solution to Problem

According to an aspect of the present disclosure, there is provided a display device including: a display panel; a frame to which the display panel is coupled; a cover assembly located in front of the display panel, and movably coupled to the frame; a bar located in a rear of the display panel, and fixed to the frame; and a rotator located below the display panel, having one side which is coupled to a front surface of the bar, and having the other side in contact with a rear surface of the cover assembly.

Advantageous Effects of Invention

Effects of the display device according to the present disclosure are described as follows.

According to at least one of embodiments of the present disclosure, it is possible to provide a cover structure capable of covering or opening the front surface of a display panel.

According to at least one of embodiments of the present disclosure, it is possible to provide a display device capable of preventing bending of a cover.

According to at least one of embodiments of the present disclosure, it is possible to provide a display device capable of reducing friction or noise due to a contact between a cover and a rotator that prevents bending of a cover.

According to at least one of embodiments of the present disclosure, it is possible to provide a display device capable of improving the operability of a cover.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

BRIEF DESCRIPTION OF DRAWINGS

FIGS. 1 to 25 are diagrams illustrating examples of a display device according to embodiments of the present disclosure.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if embodiments are described with reference to specific drawings, if necessary, reference numerals that do not appear in the specific drawings may be referred to, and reference numerals that do not appear in the specific drawings are used when the reference numerals appear in the other figures.

Referring to FIG. 1, a display device 1 may include a display panel 11. The display panel 11 may display an image.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of description, it is illustrated and described that the lengths of the first and second long sides LS1 and LS2 are longer than the lengths of the first and second short sides SS1 and SS2, but the lengths of the first and second long sides LS1 and LS2 may also substantially the same as the lengths of the first and second short sides SS1 and SS2.

A direction parallel to the long sides LS1 and LS2 of the display device 1 may be referred to as an up-down direction. A direction parallel to the short sides SS1 and SS2 of the display device 1 may be referred to as a left-right direction. A direction perpendicular to the long sides LS1 and LS2 and the short sides SS1 and SS2 of the display device 1 may be referred to as a front-rear direction.

A direction in which the display panel 11 displays an image may be referred to as front F, and a direction opposite to this may be referred to as rear R. The side of the first short side SS1 may be referred to as an upper side U. The side of the second short side SS2 may be referred to as a lower side D. The side of the first long side LS1 may be referred to as a left side Le. The side of the second long side LS2 may be referred to as a right side Ri.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Referring to FIGS. 2 and 3, a frame 20 may form a skeleton of the display device 1. The frame 20 may include an outer frame 21, a lower frame 22, an upper frame 23, and a guide frame 24. For example, the frame 20 may pass through the center of the display device and be symmetrical from side to side with respect to a reference line VV' (see FIG. 6) extending in an up-down direction.

The outer frame 21 forms a circumference of the frame 20 and may be a rectangular frame as a whole. A first outer frame 21a forms an upper side of the outer frame 21 and may extend long in the left-right direction. A second outer frame 21b forms a lower side of the outer frame 21 and may extend long in the left-right direction. A third outer frame 21c forms a left side of the outer frame 21 and may extend long in the up-down direction. A fourth outer frame 21d forms a right side of the outer frame 21 and may extend long in the up-down direction.

In addition, a first corner C1 (see FIG. 1) may be formed at a point where the first outer frame 21a and the third outer frame 21c meet. A second corner C2 (see FIG. 1) may be formed at a point where the third outer frame 21c and the second outer frame 21b meet. A third corner C3 (see FIG. 1) may be formed at a point where the second outer frame 21b and the fourth outer frame 21d meet. A fourth corner C4 (see FIG. 1) may be formed at a point where the fourth outer frame 21d and the first outer frame 21a meet.

A lower frame 22 may extend in the left-right direction between the third outer frame 21c and the fourth outer frame 21d, and be coupled to or fixed to the third outer frame 21c and the fourth outer frame 21d. The lower frame 22 may be disposed closer to the second outer frame 21b than to the first outer frame 21a.

An upper frame 23 may be located in the upper side of the lower frame 22. The upper frame 23 may be located in front of a guide frame 24 and a bar 25 described later. For example, the upper frame 23 may extend in the left-right direction between the third outer frame 21c and the fourth outer frame 21d, and may be coupled to or fixed to the third outer frame 21c and the fourth outer frame 21d. For another example, the upper frame 23 may extend in the left-right direction between a first guide frame 24a and a second guide frame 24b described later, and may be coupled to or fixed to the first guide frame 24a and the second guide frame 24b. Meanwhile, the upper frame 23 may be referred to as a center frame.

The guide frame 24 may extend long in the up-down direction between the first outer frame 21a and the lower frame 22. The first guide frame 24a may be coupled to or fixed to the third outer frame 21c in the right side of the third outer frame 21c, and the upper end of the first guide frame 24a may be coupled to or fixed to the first outer frame 21a. Furthermore, the lower end of the first guide frame 24a may be coupled to or fixed to the lower frame 22. The second guide frame 24b may be coupled to or fixed to the fourth outer frame 21d in the left side of the fourth outer frame 21d, and the upper end of the second guide frame 24b may be coupled to or fixed to the first outer frame 21a. Furthermore, the lower end of the second guide frame 24b may be coupled to or fixed to the lower frame 22.

Meanwhile, the bar 25 may extend long in the up-down direction between the first outer frame 21a and the lower frame 22, and may be coupled to or fixed to the first outer frame 21a and the lower frame 22. For example, the bar 25 may include a first bar 25a and a second bar 25b spaced apart from each other in the left-right direction. For example, a single bar 25 may be provided to be disposed in the center of the frame 20, or three or more bars 25 may be provided to be spaced apart from each other in the left-right direction. The bar 25 may be located in or adjacent to a reference line VV' that passes the center of the display device and extends in the up-down direction. Meanwhile, the bar 25 may be referred to as a vertical bar or a middle frame.

Referring to FIGS. 4 and 5, a display unit 10 of the display device 1 may include a display panel 11, a middle cabinet 12, a plate 13, a module cover 14, and a back cover 15.

The display panel 11 may be an OLED panel. The display panel 11 may divide an image into a plurality of pixels and output the image by adjusting color, brightness, and saturation for each pixel. The display panel 11 may be divided into an active area in which an image is displayed and a de-active area in which an image is not displayed. The display panel 11 may generate light corresponding to red, green, or blue color according to a control signal. Meanwhile, the display panel 11 may be implemented by various panels such as LCD.

The middle cabinet 12 may be coupled to the display panel 11 in the rear of the display panel 11. The middle cabinet 12 may form a side surface of the display unit 10. The middle cabinet 12 may cover the side surface of the display panel 11. The middle cabinet 12 may be a square frame. For example, the middle cabinet 12 may include a metal material or a plastic material.

For example, the middle cabinet 12 may include a side part 12V and a rear part 12H. The side part 12V may form a side surface of the middle cabinet 12. A part of the side part 12V may cover the side surface of the display panel 11. The rear part 12H may be provided inside the side part 12V. The rear part 12H may cover a part of the rear of the display panel 11. Meanwhile, a gap pad 12a may be provided on the rear surface of the rear part 12H and may face the outer frame 21.

The plate 13 may be coupled to the display panel 11 at the rear of the display panel 11. In this case, an adhesive member T may be coupled to the display panel 11 and the plate 13 at between the display panel 11 and the plate 13. For example, the adhesive member T may be a double-sided tape.

The module cover 14 may be coupled to or fixed to the plate 13 at the rear of the plate 13. That is, the module cover 14 may cover the rear of the plate 13. The module cover 14 and the plate 13 may be disposed between the display panel 11 and the rear part 12H. A printed circuit board PCB or an electronic component may be installed in the rear surface of the module cover 14. For example, the module cover 14 may include a metal material. A rigid part 14a may be formed while being pressed from the front surface of the module cover 14 to the rear. Thus, the rigid part 14a may improve torsional rigidity and/or bending rigidity of the module cover 14. Meanwhile, the module cover 14 may be referred to as a main frame or an inner frame.

The back cover 15 may cover the rear of the module cover 14. The back cover 15 may form part of the rear surface of the display device 1. For example, the back cover 15 may include a metal material or a plastic material.

Meanwhile, the first outer frame 21a may include a vertical portion 21V and a horizontal portion 21H. The vertical portion 21V and the horizontal portion 21H may extend long in the left-right direction along the edge of the first outer frame 21a.

The vertical portion 21V may form an upper surface of the first outer frame 21a. The vertical portion 21V may have a width in a direction intersecting the display unit 10. In other words, the length of the vertical portion 21V may be defined in the left-right direction, the width of the vertical portion 21V may be defined in the front-rear direction, and the thickness of the vertical portion 21V may be defined in the up-down direction. A part of the vertical portion 21V may cover the side surface of the display unit 10.

The horizontal portion 21H may be provided in the lower side of the vertical portion 21V. The horizontal portion 21H may be disposed parallel to the display unit 10 at the rear of the display unit 10. In other words, the length of the horizontal portion 21H may be defined in the left-right direction, the width of the horizontal portion 21H may be defined in the up-down direction, and the thickness of the horizontal portion 2H may be defined in the front-rear direction. The horizontal portion 21H may cover a part of the rear of the display unit 10.

For example, the horizontal portion 21H may include a first horizontal portion 21Ha, a second horizontal portion 21Hb, and a third horizontal portion 21Hc that are spaced apart from each other in the front-rear direction. In this case, the width of the first horizontal portion 21Ha may be larger than that of the second horizontal portion 21Hb, and the width of the third horizontal portion 21Hc may be smaller than that of the second horizontal portion 21Hb. In addition, the first horizontal portion 21Ha may be bent at least twice.

A coupling part 210 may form a part of the first horizontal portion 21Ha, and may form a rearmost surface of the first horizontal portion 21Ha. The first guide frame 24a may contact the inside of the coupling part 210. A first fixing part 14b may protrude from the rigid part 14a toward the first guide frame 24a, that is, in a rearward direction.

The first fixing part 14b, the first guide frame 24a, and the coupling part 210 may be coupled to each other through a fastening member. For example, a first guide hole 241 may be formed to penetrate the first guide frame 24a, and a first coupling hole 211 may be formed to penetrate the coupling part 210. In this case, the first guide hole 241 and the first coupling hole 211 may be aligned with the first fixing part 14b, and the first fixing part 14b may be a pemnut fastened with a screw. Meanwhile, a coupling structure of the module cover 14 and the first guide frame 24a for the first outer frame 21a described above may be identically applied to a coupling structure of the module cover 14 and the second guide frame 24b (see FIG. 3) for the first outer frame 21a.

Accordingly, the display unit 10 may be coupled to the guide frame 24a, 24b and the first outer frame 21a through a fixing part provided in the rigid part 14a, so that torsional rigidity and/or bending rigidity of the display device may be improved.

Referring to FIG. 6, the module cover 14 may be disposed between the third outer frame 21c and the fourth outer frame 21d. The module cover 14 may be located in front of the bar 25. The upper end of the module cover 14 may be coupled to the first outer frame 21a, and the lower end of the module cover 14 may be coupled to the upper frame 23.

Electronic components may be mounted on the rear surface of the module cover 14. A first board E1, a second board E2, and a third board E3 may be spaced apart from each other but electrically connected, and may be mounted on the rear surface of the module cover 14.

The first board E1 may be a power supply board that supplies power to each component of the display device 1. The second board E2 may be a timing controller board that provides an image signal to the display panel 11 (see FIG. 5). In this case, a cable hole CH may be adjacent to the lower end of the module cover 14 and formed to penetrate the module cover 14, and a cable (not shown) may be connected to the display panel 11 of the second board E2 through the cable hole CH. The third board E3 may be a main board that controls each component of the display device 1.

A speaker SPK may be fixed on the lower frame 22 at between the upper frame 23 and the lower frame 22, and provide sound to the front of the display device 1. For example, a left speaker may be disposed between the third outer frame 21c and the first bar 25a, and a right speaker may be disposed between the fourth outer frame 21d and the second bar 25b.

Referring to FIG. 7, a mount 70 may be coupled to the coupling part 210 at the rear of the coupling part 210. In this case, the coupling part 210 may be coupled to the module cover 14 and the mount 70 at between the module cover 14 and the mount 70.

A seating part 213a may be formed while being lowered from the rear surface of the coupling part 210 in a forward direction, and may extend long in the left-right direction. A thickness of a lower end 213a1 of the seating part 213a may be smaller than a thickness of a portion of the coupling part 210 where the seating part 213a is not formed. In the longitudinal direction of the seating part 213a, a distal end 213a2 of the seating part 213a may be formed to be stepped with respect to a portion of the coupling part 210 where the seating part 213a is not formed. Meanwhile, the distal end 213a2 of the seating part 213a may be a left distal end 213a2 or a right distal end 213a2 of the seating part 213a.

The mount 70 may include a contact portion 70a and a flat plate portion 70b.

The contact portion 70a may contact the rear surface of the seating part 213a. For example, a front boss 70aa protrudes from the contact portion 70a toward the seating part 213a and may be inserted into an insertion groove provided in the rear surface of the seating part 213a. For another example, the front boss may protrude from the seating part 213a toward the contact portion 70a and be inserted into an insertion groove provided in the front surface of the contact portion 70a. Accordingly, the coupling of the contact portion 70a to the seating part 213a may be guided. Meanwhile, the contact portion 70a may be screwed to the seating part 213a near the front boss 70aa.

The flat plate portion 70b may be formed while being lowered in a forward direction with respect to the contact portion 70a, and may face the rear surface of the module cover 14. In this case, a stepped portion (no reference numeral) may be formed between the contact portion 70a and the flat plate portion 70b, and may contact or be hooked to the lower end 213a1 of the seating part 213a. Accordingly, the coupling of the mount 70 to the seating part 213a may be guided.

Referring to FIGS. 7 and 8, the bar 25 may be coupled to the seating part 213a and the mount 70 at the rear of the seating part 213a and the mount 70. The bar 25 may include a body 251 extending long in the up-down direction.

For example, the bar 25 may include a first bar 25a and a second bar 25b spaced apart from each other in the left-right direction. The first bar 25a may be adjacent to the left side of the mount 70 and coupled to the seating part 213a and the mount 70. The second bar 25b may be adjacent to the right side of the mount 70 and coupled to the seating part 213a and the mount 70.

A protrusion 251a may be adjacent to the upper end of the body 251 and protrude forward from the body 251. For example, the protrusion 251a may be formed by cutting a part of the body 251 and bending forward. The protrusion 251a may contact or be hooked to the lower end 213a1 of the seating part 213a. Thus, the coupling of the bar 25 to the seating part 213a may be guided. Meanwhile, a part of the body 251 may be located in the upper side of the protrusion 251a, contact the seating part 213a, and be screwed into a fastening hole 214a of the seating part 213a.

An insertion part 251b may be provided at the lower end of the body 251 and may be formed while being bent forward from the body 251. The insertion part 251b may be inserted into the lower frame 22 (see FIG. 6) and coupled to the lower frame 22 through a fastening member such as a screw. Accordingly, the bar 25 may be coupled to the first outer frame 21a and the lower frame 22 at between the first outer frame 21a (see FIG. 6) and the lower frame 22.

An upper bending part 252a may be bent rearward from the left and right ends of the body 251. The upper bending part 252a may extend long in the up-down direction. In the longitudinal direction of the upper bending part 252a, one end of the upper bending part 252a may be provided at an upper end of the body 251. For example, the upper bending part 252a provided in the first bar 25a may contact or be hooked to the left end of the seating part 213a, and may be referred to as a first upper bending part. For example, the upper bending part 252a provided in the second bar 25b may contact or be hooked to the right end of the seating part 213a, and may be referred to as a second upper bending part. Thus, the coupling of the bar 25 to the seating part 213a may be guided.

A lower bending part 252b may be spaced downward from the upper bending part 252a, and may be bent forward at left and right ends of the body 251. Thus, the lower bending part 252b and the upper bending part 252a may improve the rigidity of the bar 25, and minimize the interference of the cable to them. In other words, it may be advantageous that the upper bending part 252a is bent rearward in consideration of the coupling of the bar 25 to the mount 70 and the seating part 213a located in the front of the body 251. In addition, it may be advantageous that the lower bending part 252b is bent forward to minimize interference with a cable located in a rear of the lower bending part 252b.

A bar rigid part 251c may be formed while being pressed from the rear surface of the body 251 toward the front. At least a part of the bar rigid part 251c may be disposed between the lower end of the upper bent part 252a and the upper end of the lower bent part 252b. For example, the upper portion of the bar rigid part 251c may be located in the upper side of the lower end of the upper bending part 252a, and the lower portion of the bar rigid part 251c may be located in the lower side of the upper end of the lower bending part 252b. Accordingly, the bar rigid part 251c may supplement or improve rigidity between the upper bending part 252a and the lower bending part 252b.

Meanwhile, a vertical rigid part 71 may be formed while being pressed from the front surface of the mount 70 in a rearward direction, and may extend in the longitudinal direction of the bar 25. For example, a first vertical rigid part 71a may be adjacent to the left side of the mount 70 and face the front surface of the first bar 25a. For example, a second vertical rigid part may be adjacent to the right side of the mount 70 and face the front surface of the second bar 25b.

In addition, a rear boss 73, 74 may protrude from the rear surface of the vertical rigid part 71 toward the bar 25, i.e., in a rearward direction. For example, the rear boss 73, 74 may include rear bosses spaced apart from each other in the up-down direction which is the longitudinal direction of the vertical rigid part 71. An insertion hole 253, 254 may be formed to penetrate the body 251, and the rear boss 73, 74 may be inserted thereinto. Thus, the coupling of the bar 25 to the vertical rigid part 71 may be guided. Meanwhile, the body 251 may be screwed to the vertical rigid part 71.

In addition, a bar fixing part 14d, 14e may protrude toward the bar 25 from the rear surface of the rigid part 14a. The bar fixing part 14d, 14e and the bar 25 may be coupled to each other through a fastening member. For example, a bar hole 251d, 251e (see FIG. 18) may be formed to penetrate the body 251. In this case, in the front-rear direction, the bar hole 251d, 251e may be arranged with the bar fixing part 14d, 14e, and the bar fixing part 14d, 14e may be a pemnut fastened with screw.

For example, a first bar fixing part 14d may be adjacent to the lower side of the mount 70 but spaced downward from the lower end of the mount 70. A first bar hole 251d may be formed to penetrate the bar rigid part 251c and arranged with the first bar fixing part 14d. For example, a second bar fixing part 14e may be spaced downward from the first bar fixing part 14d. A second bar hole 251e may be spaced downward from the first bar hole 251d, may be formed to penetrate the body 251, and may be arranged with the second bar fixing part 14e.

Accordingly, the bar 25 may be coupled to the first outer frame 21a, the mount 70, and the module cover 14 as one body. That is, deformation or damage to a structure of the display device, such as the frame 20, due to the load applied to the mount 70 through a bracket 900 (see FIG. 2) described later can be minimized. The bracket 900 may be disposed at the rear of the back cover 15, and may be coupled to the back cover 15 and the mount 70 (see FIG. 2). In this case, the display device 1 may be installed on a fixture such as a wall through the bracket 900.

Referring to FIGS. 6 and 9, a supporter 30 may extend long in the up-down direction. The supporter 30 may include a first part 31, a second part 32, and a third part 33.

The first part 31 may form the front surface of the supporter 30 and define the entire length of the supporter 30. The second part 32 may be bent in a rearward direction from the first part 31 and form a side surface of the supporter 30. The second part 32 may be disposed closer to the upper end than the lower end of the first part 31. For example, the upper end of the second part 32 may be connected to the upper end of the first part 31, and the length of the second part 32 may be about ½ of the length of the first part 31. The third part 33 may be bent to the right side or left side from the second part 32 and face the first part 31. At this time, the third part 33 may be spaced in a rearward direction from the first part 31. For example, the first part 31, the second part 32, and the third part 33 may be provided as one body. For another example, the first part 31, the second part 32, and the third part 33 may be separately provided, and may be coupled to each other through screw coupling or welding.

A supporter hole 312 may be formed to penetrate the first part 31 in the front-rear direction. For example, the supporter hole 312 may be provided with a pair of holes spaced apart from each other left and right. For example, the supporter hole 312 may include supporter holes 312a, 312b, and 312c spaced apart from each other in the longitudinal direction of the first part 31. The first supporter hole 312a may be adjacent to the upper end of the first part 31, the third supporter hole 312c may be adjacent to the lower end of the first part 31, and the second supporter hole 312b may be disposed between the first supporter hole 312a and the third supporter hole 312c.

The supporter 30 may include a first supporter 30a and a second supporter 30b spaced apart from each other in the left-right direction. The first supporter 30a may be adjacent to the third outer frame 21c, and the second supporter 30b may be adjacent to the fourth outer frame 21d. The second part 32 of the first supporter 30a may be provided at the left distal end of the first part 31, and the third part 33 of the first supporter 30a may be bent to the right side from the second part 32. The second part 32 of the second supporter 30b may be provided at the right distal end of the first part 31, and the third part 33 of the second supporter 30b may be bent to the left side from the second part 32.

For example, the first supporter 30a and the second supporter 30b may be symmetrical from side to side with respect to a reference line VV' that passes through the center of the display device and extends in the up-down direction.

Referring to FIGS. 6 and 10, the supporter 30 may be detachably coupled to a cover assembly 40 at the rear of the cover assembly 40. The cover assembly 40 may include a cover base 41, a cover body 42, and a cover 43.

The cover base 41 may be a rectangular plate as a whole. The base hole 411 may be formed to penetrate the cover base 41 in the front-rear direction, and may face the speaker SPK. The first supporter 30a may be adjacent to the left side of the cover base 41, and the first part 311 of the first supporter 30a may contact the rear surface of the cover base 41. In this case, a fastening member F, such as a screw, may penetrate the hole 412 of the cover base 41 from the front of the cover base 41 and be fastened to the supporter hole 312 of the first supporter 30a. The second supporter 30b may be adjacent to the right side of the cover base 41, and the first part 311 of the second supporter 30b may contact the rear surface of the cover base 41. In this case, a fastening member F, such as a screw, may penetrate the hole 412 of the cover base 41 from the front of the cover base 41 and be fastened to the supporter hole 312 of the second supporter 30b. The cover base 41 may be disposed in front of the display unit 10 (see FIG. 5).

The cover body 42 may be detachably coupled to the cover base 41 at the front of the cover base 41. A body hole 421 may be formed to penetrate the cover body 42 in the front-rear direction and may face the base hole 411. For example, the body hole 421 may be provided with small-sized pores.

The cover 43 may be detachably coupled to the cover body 42 at the front of the cover body 42. For example, the cover 43 may include a fabric material. Meanwhile, the cover 43 may be referred to as a jersey.

Referring to FIGS. 11 and 12, the third outer frame 21c may cover the lateral surface and rear side of the first supporter 30a, and the cover assembly 40 (41, 42, 43) may cover the front of the first supporter 30a. A first gap ga may be formed between the third outer frame 21c and the first guide frame 24a. That is, the second part 32 of the first supporter 30a may be disposed in the first gap ga, and the first supporter 30a and the cover assembly 40 may be disposed to be movable in the up-down direction with respect to the third outer frame 21c and the first guide frame 24a.

In this case, the first supporter 30a may surround a part of the first guide frame 24a. In other words, the second gap gb may be formed between the first part 31 and the third part 33 of the first supporter 30a, and a part of the first guide frame 24a may be disposed in the second gap gb.

Meanwhile, the description of the first supporter 30a for the aforementioned third outer frame 21c and the first guide frame 24a may be identically applied to the description of the second supporter 30b for the fourth outer frame 21d and the second guide frame 24b (see FIG. 6).

Referring to FIGS. 12 and 13, a first lift assembly 60a may be located in a rear of the first guide frame 24a and may be installed on the lower frame 22. The first lift assembly 60a may provide power to the first supporter 30a. Specifically, the first lift assembly 60a may include a motor 61, a motor mount 62, a torque limiter 63, a worm 64, a worm wheel 65, a lead screw 51, a connector 52, and a cap 53.

The motor 61 may provide rotational force. The motor 61 may be installed on the lower frame 22 through the motor mount 62. The torque limiter 63 may be connected to the rotation shaft of the motor 61 to limit the torque of the motor.

The worm 64 may be fixed to the rotation shaft of the motor 61 and may be rotated together with the rotation shaft. For example, the worm 64 may extend in the left-right direction and rotate about an axis parallel to the left-right direction. The worm wheel 65 may be engaged with a screw thread formed on an outer circumferential surface of the worm 64. The worm wheel 65 may extend in the up-down direction, and rotate about an axis parallel to the up-down direction.

The lead screw 51 may extend long in the up-down direction, and the lower end of the lead screw 51 may be fixed to the worm wheel 65. A male screw thread may be formed on an outer circumferential surface of the lead screw 51.

The connector 52 may be formed in a block shape as a whole. A connector hole (no reference numeral) may be formed to penetrate the connector 52 in the up-down direction, and the lead screw 51 may penetrate the connector hole. A female screw thread may be formed at a portion forming a boundary of the connector hole of the connector 52 and be engaged with the male screw thread. One side of the connector 52 may be coupled to or fixed to the third part 33 of the first supporter 30a.

The cap 53 may be provided in the upper side of the connector 52. The cap 53 may be formed in a ring shape as a whole. The lead screw 51 may penetrate the connector hole and the cap 53.

A rail 242 may protrude from the rear surface of the first guide frame 24a toward the third part 33 of the first supporter 30a, and may be spaced apart from the third part 33. The rail 242 may extend long in the up-down direction. The rail 242 may be formed in an H beam or I beam shape as a whole. The rail 242 may guide the vertical movement of a slider 34 described later.

The slider 34 may be provided on the front surface of the third part 33 of the first supporter 30a, and the slider 34 may surround a part of the rail 242. That is, the slider 34 may be movably coupled to the rail 242 in the up-down direction. For example, the slider 34 may include at least two sliders spaced apart from each other in the up-down direction.

Accordingly, when the motor 61 is driven, the first supporter 30a may move up and down along the lead screw 51.

Meanwhile, a second lift assembly 60b may be located in a rear of the second guide frame 24b and may be installed on the lower frame 22 (see FIG. 6). The second lift assembly 60b may provide power to the second supporter 30b. The second lift assembly 60b and the first lift assembly 60a may be symmetrical from side to side with respect to the reference line VV' (see FIG. 6).

Accordingly, in response to the operation of the first lift assembly 60a and the second assembly 60b, the cover assembly 40 fixed to the first supporter 30a and the second supporter 30b may be ascended or descended.

Referring to FIG. 14, a stopper 54 may be fixed to the first guide frame 24a at the rear of the first guide frame 24a. The upper end of the lead screw 51 may be rotatably coupled to the lower side of the stopper 54. The cap 53 may face the lower side of the stopper 54 and may be detachably coupled to the lower side of the stopper 54. Meanwhile, the stopper 54 may be referred to as a holder.

Accordingly, when the cap 53 is coupled to the stopper 54, the stopper 54 may limit the ascending My of the connector 52 corresponding to the rotation of the lead screw 51.

Referring to FIG. 15, the cover 43 may move in the up-down direction at the front of the display panel 11.

Referring to the left drawing of FIG. 15, in a first state of the display device, the cover 43 may not cover the display panel 11. In this case, the height h1 of the forwardly exposed area of the display panel 11 may be the entire height of the display panel 11.

Referring to the right drawing of FIG. 15, in a second state of the display device, the cover 43 may cover at least a portion of the display panel 11. In this case, the height h2 of the forwardly exposed area of the display panel 11 may be smaller than the entire height of the display panel 11.

That is, the cover 43 may gradually cover the display panel 11 while ascending, or may gradually expose the display panel 11 while descending.

Referring to FIG. 16, the cover base 41 may be spaced forward from the display panel 11 (see gs). In this case, when the cover base 41 is bent toward the display panel 11 by an external force or the like (see B), the cover base 41 may collide with the display panel 11 and may not go up or go down. In addition, the front surface of the display panel 11 may be scratched by the cover base 41 and may be damaged or broken.

Accordingly, it is necessary to prevent the bending of the cover base 41 toward the display panel 11.

Referring to FIGS. 16 and 17, the base BS may be coupled to the bar 25 and the lower frame 22 at the rear of the bar 25. The base B S may be formed of a plate as a whole, and may support the rear of the bar 25.

A rotator 256 may be provided in the front surface of the bar 25. The rotator 256 may be disposed between the display panel 11 and the lower frame 22. The rotator 256 may be disposed between the bar 25 and the cover base 41, and may contact the rear surface of the cover base 41. That is, the rotator 256 may support the cover base 41 movably.

For example, the rotator 256 may include a first roller provided on the front surface of the first bar 25a and a second roller provided on the front surface of the second bar 25b.

Referring to FIGS. 18 and 19, a holder 255 may protrude forward from the body 251. For example, the holder 255 may be formed by cutting a part of the body 251 and bending it toward the cover base 41 (see FIG. 16).

A shaft 257 of the rotator 256 may be formed in one side of the rotator 256 facing the holder 255 and coupled to the holder 255. For example, the rotator 256 may be a roller or a ball. That is, as the rotator 256 is rotatably provided, friction due to contact between the rotator 256 and the cover base 41 (see FIG. 16) may be minimized.

Referring to FIG. 18, for example, the outer circumferential surface of the rotator 256 may be formed smoothly. The material of the rotator 256 may be different from that of the cover base 41. The rotator 256 may include urethane, resin, or a metal material.

For another example with reference to FIG. 19, the cushioning material 258 may cover a part of the outer circumferential surface of the rotator 256. The cushioning material 258 may include a rubber or silicon material.

Accordingly, vibration or noise caused by movement of the cover base 41 with respect to the rotator 256 can be minimized. Referring to FIG. 20, a buffer sheet 413a, 413b) may be provided on the rear surface of the cover base 41 at a position corresponding to the movement trajectory of the cover base 41 with respect to the rotator 256. The buffer sheet (413a, 413b) contacts the rotator 256, and includes a rubber or silicon material to reduce vibration or noise caused by the movement of the cover base 41 with respect to the rotator 256.

Referring to FIG. 20, the rotator 256 provided in the first bar 25a and the rotator 256 provided in the second bar 25b may be spaced apart from each other in the left-right direction. For example, the rotator 256 provided on the first bar 25a and the rotator 256 provided on the second bar 25b may be aligned in the left-right direction. The rear surface of the cover base 41 may movably contact the rotator 256.

Accordingly, the rotator 256 may prevent the cover base 41 from bending toward the display panel 11 (see FIG. 16). In addition, the cover base 41 may be stably ascend or descend by the rotator 256.

Referring to FIG. 21, a pair of rotators 256a and 256b provided in the first bar 25a may be spaced apart from each other in the up-down direction. The pair of rotators 256a and 256b provided in the second bar 25b may be spaced apart from each other in the up-down direction. For example, the pair of rotators 256a and 256b provided in the first bar 25a and the pair of rotators 256a and 256b provided in the second bar 25b may be arranged with each other in the left-right direction. The rear surface of the cover base 41 may movably contact the pair of rotators 256.

Accordingly, the rotator 256 may further prevent the cover base 41 from bending toward the display panel 11 (see FIG. 16). In addition, the cover base 41 may be more stably ascend or descend by the rotator 256.

Meanwhile, it is also possible that each of the first bar 25a and the second bar 25b includes three or more rotators 256.

Referring to FIGS. 22 and 23, a plate 259 may protrude forward from the body 251. The plate 259 may be located in the lower side of the holder 255. For example, the plate 259 may be formed by cutting a part of the body 251 and bending it toward the cover base 41 (see FIG. 16).

A support roller 262 may be spaced apart from the rotator 256 in a radial direction of the rotator 256. The support roller 262 may be rotatably coupled to the plate 259 by extending in the left-right direction and penetrating the plate 259.

A support sheet 261 may be located in one side of the plate 259 and may be wound around or unwound from the support roller 262. One end of the support sheet 261 may be fixed to the support roller 262, and the other end of the support sheet 261 may be fixed to the upper end of the cover base 41 (see FIG. 16). A part of the support sheet 261 may contact the rotator 256 and the cover base 41 at between the rotator 256 and the cover base 41. That is, the rotator 256 may guide the movement of the support sheet 261 wound around or unwound from the support roller 262.

For example, the support sheet 261 may be convex toward the rear surface of the cover base 41, and have a certain curvature Rs. The support sheet 261 may support the rear surface of the cover base 41, and apply a certain tension to the support sheet 261. In this case, the outer circumferential surface of the rotator 256 may be convex in the radial direction of the rotator 256, and may contact the inner surface of the support sheet 261.

The spring 263 may be located in the other side of the plate 259. The spring 263 may be opposite to the support sheet 261 with respect to the plate 259. The spring 263 has elasticity, one end of the spring 263 may be fixed to the support roller 262, and the other end of the spring 263 may be fixed to a fixed shaft 264. Here, the fixed shaft 264 may be provided in the other side of the plate 259, and may be spaced apart from the support roller 262 in the radial direction of the support roller 262. In this case, a part of the spring 263 may be wound around the support roller 262. Meanwhile, the spring 263 may be referred to as a rotational spring, a torsion spring, or a spiral torsion spring.

Accordingly, when the cover base 41 ascends, the support sheet 261 may be unwound from the support roller 262. At this time, the support roller 262 may rotate in a first rotational direction. In addition, the spring 263 wound around the support roller 262 may spread from the support roller 262 in the radial direction of the support roller 262.

Then, when the cover base 41 descends, the spring 263 is wound around the support roller 262 again by an elastic force, so that the support roller 262 can rotate in a second rotational direction opposite to the first rotational direction. At this time, the support sheet 261 may be wound around the support roller 262 again.

The aforementioned plate 259, support roller 262, support sheet 261, spring 263, and fixed shaft 264 may be provided in the first bar 25a and the second bar 25b.

Accordingly, the support sheet 261 may prevent a portion of the cover base 41 that is out of the rotator 256 from bending toward the display panel 11 (see FIG. 16).

Referring to FIGS. 24 and 25, the aforementioned plate 259, support roller 262, support sheet 261, spring 263, and fixed shaft 264 may be disposed between a pair of rotators 256a and 256b. In this case, a part of the support sheet 261 may be disposed between the cover base 41 and a rotator located in the upper side of the plate 259 among the pair of rotators 256a and 256b, and the rotator may guide the movement of the support sheet 261.

Alternatively, the aforementioned plate 259, support roller 262, support sheet 261, spring 263, and fixing shaft 264 may be disposed in the lower side of the pair of rotators 256a and 256b. In this case, a portion of the support sheet 261 may be disposed between the pair of rotators 256a and 256b and the cover base 41, and the pair of rotators 256a and 256b may guide the movement of the support sheet 261.

According to an aspect of the present disclosure, there is provided a display device including: a display panel; a frame to which the display panel is coupled; a cover assembly located in front of the display panel, and movably coupled to the frame; a bar located in a rear of the display panel, and fixed to the frame; and a rotator located below the display panel, having one side which is coupled to a front surface of the bar, and having the other side in contact with a rear surface of the cover assembly.

In addition, according to another aspect of the present disclosure, when the cover assembly moves, the rotator may rotate while being in contact with the rear surface of the cover assembly.

In addition, according to another aspect of the present disclosure, the rotator may be a roller or a ball.

In addition, according to another aspect of the present disclosure, the rotator may include a cushioning material which is wrapped around a portion of an outer surface of the rotator and formed of rubber or silicon material.

In addition, according to another aspect of the present disclosure, the display device may further include a cushioning sheet which is coupled to the rear surface of the cover assembly at a position corresponding to a movement trajectory of the cover assembly with respect to the rotator, and the rotator may be in contact with the cushioning sheet.

In addition, according to another aspect of the present disclosure, the display device may further include a plate protruding from the bar toward the cover assembly; a support roller which penetrate the plate, and which is rotatably coupled to the plate; and a support sheet which is located in one side of the plate, and which is wound around or unwound from the support roller, the support sheet having one end fixed to the support roller and the other end fixed to an upper end of the cover assembly, wherein the support roller may be located below the rotator, and wherein a part of the support sheet may be in contact with the rotator and the cover assembly at between the rotator and the cover assembly.

In addition, according to another aspect of the present disclosure, the support sheet may be convex toward the cover assembly, and may support a rear surface of the cover assembly.

In addition, according to another aspect of the present disclosure, the display device may further include a spring which has elasticity, which is opposite to the support sheet with respect to the plate, and which is fixed to the support roller, wherein the spring may be deformed when the support sheet is unwound from the support roller, and may be restored when the support sheet is wound around the support roller.

In addition, according to another aspect of the present disclosure, the bar may include: a body extending in a moving direction of the cover assembly; and a holder located below the display panel, and protruding from the body toward the cover assembly, wherein one side of the rotator may be coupled to the holder.

In addition, according to another aspect of the present disclosure, the bar may extend in an up-down direction from a position adjacent to a vertical line passing through a center of the cover assembly.

In addition, according to another aspect of the present disclosure, the bar may include: a first bar located in a left of the vertical line; and a second bar located in a right side of the vertical line, and the rotator may include: a first rotator coupled to a front surface of the first bar; and a second rotator coupled to a front surface of the second bar.

In addition, according to another aspect of the present disclosure, the first rotator and the second rotator may be arranged with each other in a left-right direction.

In addition, according to another aspect of the present disclosure, the first rotator may include a pair of first rotators spaced apart from each other in an up-down direction, and the second rotator may include a pair of second rotators spaced apart from each other in an up-down direction.

In addition, according to another aspect of the present disclosure, the cover assembly may include: a cover base which forms a rear surface of the cover assembly, and which is in contact with the rotator; and a cover detachably coupled to the cover base in front of the cover base.

In addition, according to another aspect of the present disclosure, the display device may further include a lift assembly which provides power to the cover assembly, and the cover may open or close at least a part of a front surface of the display panel.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a display panel;
a frame to which the display panel is coupled;
a cover assembly which moves linearly to cover or expose a front of the display panel;
a bar located in a rear of the display panel, and fixed to the frame; and
a rotator which is fixed to a front of the bar and which is adjacent an edge of the display panel,
wherein the rotator contacts a rear surface of the cover assembly to separate a rear surface of the cover assembly from a front surface of the display panel.

2. The display device of claim 1, wherein when the cover assembly moves, the rotator rotates while being in contact with the rear surface of the cover assembly.

3. The display device of claim 1, wherein the rotator is a roller or a ball.

4. The display device of claim 1, wherein the rotator comprises a cushioning material which is wrapped around a portion of an outer surface of the rotator and formed of rubber or silicon material.

5. The display device of claim 1, further comprising a buffer sheet which is coupled to the rear surface of the cover assembly at a position corresponding to a movement trajectory of the cover assembly with respect to the rotator,
wherein the rotator is in contact with the buffer sheet.

6. The display device of claim 1, wherein the bar comprises:
a body extending in a moving direction of the cover assembly; and
a holder located below the display panel, and protruding from the body toward the cover assembly,
wherein one side of the rotator is coupled to the holder.

7. The display device of claim 1, wherein the bar extends in an up-down direction from a position adjacent to a vertical line passing through a center of the cover assembly.

8. The display device of claim 7, wherein the bar comprises:
a first bar located in a left of the vertical line; and
a second bar located in a right side of the vertical line,
wherein the rotator comprises:
a first rotator coupled to a front surface of the first bar; and
a second rotator coupled to a front surface of the second bar.

9. The display device of claim 8, wherein the first rotator and the second rotator are arranged with each other in a left-right direction.

10. The display device of claim 8, wherein the first rotator comprises a pair of first rotators spaced apart from each other in an up-down direction, and
wherein the second rotator comprises a pair of second rotators spaced apart from each other in an up-down direction.

11. The display device of claim 1, wherein the cover assembly comprises:
a cover base which forms a rear surface of the cover assembly, and which is in contact with the rotator; and
a cover detachably coupled to the cover base in front of the cover base.

12. The display device of claim 11, further comprising a lift assembly which provides power to the cover assembly.

13. A display device comprising:
a display panel;
a frame to which the display panel is coupled;
a cover assembly located in front of the display panel, and movably coupled to the frame;
a bar located in a rear of the display panel, and fixed to the frame;
a rotator located below the display panel, having one side which is coupled to a front surface of the bar, and having another side in contact with a rear surface of the cover assembly;
a plate protruding from the bar toward the cover assembly;
a support roller which penetrate the plate, and which is rotatably coupled to the plate; and a support sheet which is located in one side of the plate, and which is wound around or unwound from the support roller, the support sheet having one end fixed to the support roller and another end fixed to an upper end of the cover assembly, wherein the support roller is located below the rotator, and wherein a part of the support sheet is in contact with the rotator and the cover assembly at between the rotator and the cover assembly.

14. The display device of claim 13, wherein the support sheet is convex toward the cover assembly, and supports a rear surface of the cover assembly.

15. The display device of claim 14, further comprising a spring which has elasticity, which is opposite to the support sheet with respect to the plate, and which is fixed to the support roller, wherein the spring is deformed when the support sheet is unwound from the support roller, and is restored when the support sheet is wound around the support roller.

* * * * *